(12) United States Patent
Xue et al.

(10) Patent No.: US 12,368,701 B2
(45) Date of Patent: Jul. 22, 2025

(54) SUBSCRIPTION DATA MANAGEMENT METHOD AND APPARATUS

(71) Applicants: Huawei Technologies Co., Ltd., Shenzhen (CN); UNIVERSITY OF SCIENCE AND TECHNOLOGY OF CHINA, Hefei (CN)

(72) Inventors: Kaiping Xue, Hefei (CN); Hangyu Tian, Hefei (CN); Jianan Hong, Shenzhen (CN)

(73) Assignees: Huawei Technologies Co., Ltd, Shenzhen (CN); University of Science and Technology of China, Hefei (CN)

( * ) Notice: Subject to any disclaimer, the term of this patent is extended or adjusted under 35 U.S.C. 154(b) by 505 days.

(21) Appl. No.: 17/738,899

(22) Filed: May 6, 2022

(65) Prior Publication Data

US 2022/0272511 A1 Aug. 25, 2022

Related U.S. Application Data

(63) Continuation of application No. PCT/CN2020/127442, filed on Nov. 9, 2020.

(30) Foreign Application Priority Data

Nov. 8, 2019 (CN) .......................... 201911089880.3

(51) Int. Cl.
*H04L 9/40* (2022.01)
*H04L 9/00* (2022.01)
(Continued)

(52) U.S. Cl.
CPC ........ *H04L 63/0807* (2013.01); *H04L 9/0869* (2013.01); *H04L 9/3213* (2013.01); *H04L 9/50* (2022.05); *H04W 4/60* (2018.02)

(58) Field of Classification Search
CPC ......... H04W 4/60; H04W 8/12; H04W 12/06; H04W 12/69; H04W 8/20; H04L 9/0869;
(Continued)

(56) References Cited

U.S. PATENT DOCUMENTS 5,819,178 A 10/1998 Cropper
10,289,835 B1 * 5/2019 Machani ............. H04L 63/0861
(Continued)

FOREIGN PATENT DOCUMENTS

CN 106856602 A 6/2017
CN 109168156 A 1/2019
(Continued)

OTHER PUBLICATIONS

NGMN Alliance "5G End-to-End Architecture Framework," v3.0.8, Total 71 pages, ngmn e. V., Frankfurt, Germany (Aug. 28, 2019).
(Continued)

*Primary Examiner* — Taghi T Arani
*Assistant Examiner* — Blake I Narramore
(74) *Attorney, Agent, or Firm* — Leydig, Voit & Mayer, Ltd.

(57) ABSTRACT

This application relates to a subscription data management method, apparatus, and system. The method includes: a first network element receives, from a second network element, a request message for subscription data; obtains a security token of a terminal device, where the security token is used to verify permission to obtain the subscription data; provides the security token for a blockchain, and queries the blockchain about the subscription data; and if verification succeeds, obtains address information of the subscription data from the blockchain, and sends the address information of the subscription data to the second network element. In the method, the permission to obtain the subscription data is determined by using the blockchain, so that when a sub-
(Continued)

scribed network device does not participate, a visited network device can still obtain the subscription data.

16 Claims, 9 Drawing Sheets

(51) Int. Cl.
*H04L 9/08* (2006.01)
*H04L 9/32* (2006.01)
*H04W 4/60* (2018.01)

(58) Field of Classification Search
CPC ..... H04L 9/3213; H04L 9/50; H04L 2209/80; H04L 63/0807; G06F 21/64
See application file for complete search history.

(56) References Cited

U.S. PATENT DOCUMENTS

| | | | |
|---|---|---|---|
| 10,299,128 | B1 | 5/2019 | Suthar et al. |
| 11,158,149 | B2* | 10/2021 | Robertson ............ A61B 5/0028 |
| 2010/0199341 | A1* | 8/2010 | Foti ................... H04N 21/6187 |
| | | | 726/9 |
| 2016/0262021 | A1* | 9/2016 | Lee ..................... H04W 12/062 |
| 2017/0053466 | A1* | 2/2017 | Ouellette ............ H04W 12/068 |
| 2018/0191502 | A1 | 7/2018 | Karame |
| 2018/0337782 | A1* | 11/2018 | Wu .......................... H04L 9/32 |
| 2019/0104172 | A1* | 4/2019 | Wu .............................. G06F 8/63 |
| 2019/0281053 | A1* | 9/2019 | Brown ................. H04W 12/06 |
| 2019/0380031 | A1* | 12/2019 | Suthar .................. H04W 60/00 |
| 2019/0380081 | A1* | 12/2019 | Chang .................. H04W 36/08 |
| 2021/0035090 | A1* | 2/2021 | Iannaccone .......... H04L 9/3247 |
| 2021/0400474 | A1* | 12/2021 | Stauffer ............. H04L 63/0869 |

FOREIGN PATENT DOCUMENTS

| | | |
|---|---|---|
| CN | 109451451 A | 3/2019 |
| KR | 20180069470 A | 6/2018 |
| WO | 2015081972 A1 | 6/2015 |
| WO | 2019086127 A1 | 5/2019 |

OTHER PUBLICATIONS

Zyskind et al., "Decentralizing Privacy: Using Blockchain to Protect Personal Data," 2015 IEEE CS Security and Privacy Workshops, pp. 180-184, Institute of Electrical and Electronics Engineers, New York, New York (May 21-22, 2015).

* cited by examiner

SUBSCRIPTION DATA MANAGEMENT METHOD AND APPARATUS

CROSS-REFERENCE TO RELATED APPLICATIONS

This application is a continuation of International Application No. PCT/CN2020/127442, filed on Nov. 9, 2020, which claims priority to Chinese Patent Application No. 201911089880.3, filed on Nov. 8, 2019. The disclosures of the aforementioned applications are hereby incorporated by reference in their entireties.

TECHNICAL FIELD

This application relates to the field of communication technologies, and in particular, to a subscription data management method and apparatus.

BACKGROUND

When selecting a service of an operator, a terminal device needs to subscribe to the operator, to enjoy a low service tariff in a resident service area (namely, a subscription service area). When the terminal device moves to another service area, the terminal device needs to access a communication network in the service area through roaming. A service area other than the subscription service area of the terminal device may be referred to as a roaming service area. When the terminal device performs communication in the roaming service area, a service tariff is higher. A communication network provided by an operator in a subscription service area may be referred to as a subscription network for short, and a communication network provided by the operator in a roaming service area may be referred to as a visited network for short.

After the terminal device enters a service area, a network device in a communication network in the service area needs to provide a communication service for the terminal device based on subscription data of the terminal device. The subscription data is subscribed by the terminal device to the network device in the subscribed network.

International communication is used as an example. A communication network 1 is a subscribed network of a terminal device, and a communication network 2 is a visited network of the terminal device. When a terminal device A accesses the communication network 1, the communication network 1 provides a communication service for the terminal device based on subscription data of the terminal device. When the terminal device leaves a subscription service area, and accesses the communication network 2 through roaming, the communication network 2 obtains the subscription data subscribed by the terminal device to the communication network 1, and provides a communication service for the terminal device based on the subscription data.

Currently, subscription data subscribed by the terminal device to a subscribed network is usually stored in a network device in the subscribed network. Therefore, a network device in a visited network needs to obtain the subscription data of the terminal device from the network device in the subscribed network.

An existing solution in which the network device in the visited network obtains the subscription data includes the following steps:

a network device A in the visited network sends a request for subscription data to a network device B in the subscribed network;

the network device B determines whether the network device A complies with a roaming contract formulated by the network device B, queries current location information of the terminal device, and determines whether the terminal device is performing a communication service in the visited network, where the roaming contract includes a constraint of the network device that can invoke the subscription data; and after determining that the network device A complies with the roaming contract, the network device B sends the subscription data to the network device A.

In the foregoing subscription data obtaining solution, the network device A needs to interact with the network device B for a plurality of times, and the network device B generates large system overheads. In addition, if the network device B is faulty or in a sleep state, the network device A cannot obtain the subscription data in time, and therefore cannot provide a communications service for the terminal device.

SUMMARY

This application provides a subscription data management method and apparatus. This resolves a problem that when a network device in a visited network obtains subscription data, if a network device in a subscribed network is faulty or in a sleep state, the network device cannot provide a communication service for a terminal device.

According to a first aspect, an embodiment of this application provides a subscription data management method, including:

a first network element receives a request message from a second network element, where the second network element is located in a roaming area of a terminal device, and the request message is used to request subscription data of the terminal device; obtains a security token of the terminal device, where the security token is used to verify whether the second network element has permission to obtain the subscription data;

provides the security token for a blockchain, and queries the blockchain about the subscription data; if verification succeeds, obtains address information of the subscription data from the blockchain; and sends the address information of the subscription data to the second network element.

Based on this solution, when a visited network device, for example, the second network element, needs to obtain the subscription data of the terminal device, the visited network device performs permission verification by using the blockchain, and obtains the subscription data after verification succeeds. This reduces interaction with a subscribed network device, and therefore reduces signaling overheads and power consumption of the subscribed network device. In addition, in the method, the visited network device obtains the subscription data without using the subscribed network device. Therefore, when the subscribed network device is faulty or in a sleep state, the visited network device can still successfully obtain the subscription data of the terminal device when meeting a condition for obtaining the subscription data. This ensures that the terminal device can smoothly perform communication in a visited network. Further, the permission of the visited network device is verified by using the blockchain. This can effectively and securely record information about each procedure of applying for subscription data, ensure traceability, and improve security of a roaming service.

In an embodiment, the first network element obtains the security token locally; or receives the security token sent by the second network element.

In an embodiment, the first network element obtains the security token from the received request message, where the request message carries the security token.

In an embodiment, the first network element provides an identifier of the terminal device for the blockchain, where the identifier of the terminal device is used to determine the subscription data corresponding to the terminal device.

In an embodiment, after obtaining the address information of the subscription data from the blockchain, the first network element decrypts the address information of the subscription data, to obtain a storage address of the subscription data in a database.

In an embodiment, the first network element is a blockchain handling function (Blockchain Handling Function, BCHF) in a roaming network or a BCHF in the blockchain.

In an embodiment, the second network device is an access and mobility management function (Access and Mobility Management Function, AMF) or a session management function (Session Management Function, SMF) in the roaming network.

In an embodiment, the first network device invokes a permission contract in the blockchain, to query the subscription data.

According to a second aspect, an embodiment of this application provides a subscription data management method, including:

a second network element sends a request message to a first network element, where the second network element is located in a roaming area of a terminal device, and the request message is used to request subscription data of the terminal device; receives address information of the subscription data sent by the first network element; and obtains the subscription data based on the address information of the subscription data.

In an embodiment, the request message carries a security token, and the security token is used to verify whether the second network element has permission to obtain the subscription data.

In an embodiment, after sending the request message for the subscription data to the first network element, and receiving a request, sent by the first network element, for the security token, the second network element sends the security token to the first network element.

In an embodiment, the second network element obtains the subscription data from a database based on the address information of the subscription data.

In an embodiment, the first network element is a BCHF in a roaming network or a BCHF in a blockchain.

In an embodiment, the second network element is an AMF or an SMF in the roaming network.

According to a third aspect, an embodiment of this application provides a subscription data management method, including:

a first network device stores, in a data server, subscription data obtained by subscribing to a terminal device; receives a storage address of the subscription data from the data server; stores the storage address in a blockchain, where the first network device is in a subscribed network of the terminal device; and sends a permission credential to the blockchain, where the permission credential is used to verify permission to obtain the subscription data.

Based on this solution, after determining subscription data, a subscribed network device stores, in a blockchain, a storage address of the subscription data in a data server, and delivers, to the blockchain, verified permission of a visited network device to obtain the subscription data. Therefore, the blockchain has the verified permission to obtain the subscription data. The visited network device may perform permission verification by using the blockchain, and obtains the subscription data after verification succeeds. This reduces interaction with the subscribed network device, and therefore reduces signaling overheads and power consumption of the subscribed network device In addition, in the method, the visited network device obtains the subscription data without using the subscribed network device. Therefore, when the subscribed network device is faulty or in a sleep state, the visited network device can still successfully obtain the subscription data of the terminal device when meeting a condition for obtaining the subscription data. This ensures that the terminal device can smoothly perform communication in a visited network. Further, the permission of the visited network device is verified by using the blockchain. This can effectively and securely record information about each procedure of applying for subscription data, ensure traceability, and improve security of a roaming service.

In an embodiment, the first network device determines the permission credential in the following manner: generating a first random number, and generating the permission credential based on the first random number.

In an embodiment, after generating the first random number, the first network device sends the first random number to the terminal device, where the first random number is used to generate a security token, and the security token is used to verify the permission to obtain the subscription data.

In an embodiment, the first network device receives a second random number sent by the terminal device, and generates the permission credential based on the first random number and the second random number; or receives a second random number sent by the terminal device, and generates the permission credential based on the first random number, a vehicle identifier of a second network device, and the second random number.

In an embodiment, if the first network device generates the permission credential based on the first random number, the vehicle identifier of the second network device, and the second random number, the method further includes: the first network device determines the vehicle identifier of the second network device according to a roaming agreement between the first network device and the second network device, where the second network device is located in a roaming network of the terminal device.

According to a fourth aspect, an embodiment of this application provides a subscription data management method, including:

a terminal device receives a first random number sent by a first network device; and generates a security token based on the first random number, and sends the security token to a first network element, where the security token is used to verify permission to obtain subscription data, and the first network element is located in a roaming area of the terminal device.

Based on this solution, a new and simple manner is provided. In the manner, whether the subscription data can be obtained is determined by generating the security token and using the security token for verification.

According to a fifth aspect, an embodiment of this application provides a subscription data management method, including:

a blockchain node receives a query request from a first network element, where the query request includes a security token, and the security token is used to verify whether a second network element has permission to obtain subscription data; verifies whether the security token is valid; if the security token is valid, invokes a storage contract, to obtain address information of the subscription data; and returns the address information to the first network element.

Based on this solution, when a visited network device needs to obtain the subscription data of a terminal device, the visited network device performs permission verification by using a blockchain, and obtains the subscription data after verification succeeds. This reduces interaction with a subscribed network device, and therefore reduces signaling overheads and power consumption of the subscribed network device. In addition, in the method, the visited network device obtains the subscription data without using the subscribed network device. Therefore, when the subscribed network device is faulty or in a sleep state, the visited network device can still successfully obtain the subscription data of the terminal device when meeting a condition for obtaining the subscription data. This ensures that the terminal device can smoothly perform communication in a visited network. Further, the permission of the visited network device is verified by using the blockchain. This can effectively and securely record information about each procedure of applying for subscription data, ensure traceability, and improve security of a roaming service.

In an embodiment, that the blockchain node verifies whether the security token is valid includes: verifying whether the security token is consistent with a permission credential, where the permission credential is used to verify whether the second network element has the permission to obtain the subscription data.

In an embodiment, that the blockchain node invokes the storage contract includes: the blockchain node invokes the storage contract based on a consensus algorithm of the blockchain.

In an embodiment, the blockchain node obtains a plurality of pieces of encrypted address information.

In an embodiment, the blockchain node performs decryption.

In an embodiment, the blockchain node records an execution log retrieved by the subscription data.

According to a sixth aspect, an embodiment of this application provides a subscription data management method, including: a first network device signs a roaming agreement with a second network device; and publishes a smart contract to grant permission for a second roaming device.

In an embodiment, the first network device is located at a subscribed area of a terminal device, and the second network device is located at a roaming area of the terminal device.

According to a seventh aspect, an embodiment of this application provides a communication apparatus. The communication apparatus has a function of implementing the network element in the foregoing embodiments. The function may be implemented by hardware, or may be implemented by hardware by executing corresponding software. The hardware or the software includes one or more units or modules corresponding to the foregoing function.

In an embodiment, the communication apparatus may be a first network element in a visited network, or a component that can be used by the network element, for example, a chip, a chip system, or a circuit. The communication apparatus may include a transceiver and a processor. The processor may be configured to support the communication apparatus in performing a corresponding function of the first network element. The transceiver is configured to support communication between the communication apparatus, another network element (for example, a second network element), a server (for example, a blockchain), and the like. Optionally, the communication apparatus may further include a memory. The memory may be coupled to the processor, and store program instructions and data that are necessary to the communication apparatus. The transceiver may be an independent receiver, an independent transmitter, a transceiver integrated with a receiving/transmission function, or an interface circuit.

In another embodiment, the communication apparatus may be a second network element in a visited network, or a component that can be used by the second network element, for example, a chip, a chip system, or a circuit. The communication apparatus may include a transceiver and a processor. The processor may be configured to support the communication apparatus in performing a corresponding function of the second network element. The transceiver is configured to support communication between the communication apparatus, another network element (for example, a first network element), a terminal device, and the like. Optionally, the communication apparatus may further include a memory. The memory may be coupled to the processor, and store program instructions and data that are necessary to the communication apparatus. The transceiver may be an independent receiver, an independent transmitter, a transceiver integrated with a receiving/transmission function, or an interface circuit.

According to an eighth aspect, an embodiment of this application provides a communication apparatus. The communication apparatus has a function of implementing the network device in the foregoing embodiments. The function may be implemented by hardware, or may be implemented by hardware by executing corresponding software. The hardware or the software includes one or more units or modules corresponding to the foregoing function.

In an embodiment, the communication apparatus may be a network device in a subscribed network of a terminal device, or a component that can be used by the network device, for example, a chip, a chip system, or a circuit. The communication apparatus may include a transceiver and a processor. The processor may be configured to support the communication apparatus in performing a corresponding function of the first network device. The transceiver is configured to support communication between the communication apparatus, a network device, a terminal device, a server (for example, a blockchain), and the like. Optionally, the communication apparatus may further include a memory. The memory may be coupled to the processor, and store program instructions and data that are necessary to the communication apparatus. The transceiver may be an independent receiver, an independent transmitter, a transceiver integrated with a receiving/transmission function, or an interface circuit.

In another embodiment, the communication apparatus may be a network device in a visited network of a terminal device, or a component that can be used by the network device, for example, a chip, a chip system, or a circuit. The communication apparatus may include a transceiver and a processor. The processor may be configured to support the communication apparatus in performing a corresponding function of the second network device. The transceiver is configured to support communication between the communication apparatus, a network device, a terminal device, a server (for example, a blockchain), and the like. Optionally, the communication apparatus may further include a memory. The memory may be coupled to the processor, and store program instructions and data that are necessary to the communication apparatus. The transceiver may be an independent receiver, an independent transmitter, a transceiver integrated with a receiving/transmission function, or an interface circuit.

According to a ninth aspect, an embodiment of this application provides a communication apparatus. The communication apparatus has a function of implementing the server in the foregoing embodiments. The function may be implemented by hardware, or may be implemented by hardware by executing corresponding software. The hardware or the software includes one or more units or modules corresponding to the foregoing function.

In an embodiment, the communication apparatus may be a blockchain, or a component that can be used by the blockchain, for example, a chip, a chip system, or a circuit. The communication apparatus may include a transceiver and a processor. The processor may be configured to support the communication apparatus in performing a corresponding function of the blockchain. The transceiver is configured to support communication between the communication apparatus, a network device, a terminal device, and the like. Optionally, the communication apparatus may further include a memory. The memory may be coupled to the processor, and store program instructions and data that are necessary to the communication apparatus. The transceiver may be an independent receiver, an independent transmitter, a transceiver integrated with a receiving/transmission function, or an interface circuit.

In another embodiment, the communication apparatus may be a data server, or a component that can be used by the data server, for example, a chip, a chip system, or a circuit. The communication apparatus may include a transceiver and a processor. The processor may be configured to support the communication apparatus in performing a corresponding function of the data server. The transceiver is configured to support communication between the communication apparatus, a network device, another server (for example, a blockchain), and the like. Optionally, the communication apparatus may further include a memory. The memory may be coupled to the processor, and store program instructions and data that are necessary to the communication apparatus. The transceiver may be an independent receiver, an independent transmitter, a transceiver integrated with a receiving/transmission function, or an interface circuit.

According to a tenth aspect, an embodiment of this application provides a communication apparatus, configured to implement any one of the first aspect to the sixth aspect, or any method in the first aspect to the sixth aspect.

In an embodiment, when the communication apparatus is a first network element in a visited network, the communication apparatus may include a processing unit and a communication unit.

The communication unit is configured to receive a request message from a second network element, where the second network element is located in a roaming area of a terminal device, and the request message is used to request subscription data of the terminal device.

The processing unit is configured to obtain a security token of a terminal device, where the security token is used to verify whether the second network element has permission to obtain the subscription data; provide the security token for a blockchain, and query the blockchain about the subscription data; and if verification succeeds, obtain address information of the subscription data from the blockchain.

The communication unit is configured to send the address information of the subscription data to the second network element.

In an embodiment, when the communication apparatus is a second network element in a visited network, the communication apparatus may include a processing unit and a communication unit.

The processing unit is configured to send a request message to a first network element, where the second network element is located in a roaming area of a terminal device, and the request message is used to request subscription data of the terminal device.

The communication unit is configured to receive address information of the subscription data sent by the first network element.

The processing unit is configured to obtain the subscription data based on the address information of the subscription data.

In an embodiment, when the communication apparatus is a network device in a subscribed network of a terminal device, the communication apparatus may include a processing unit and a communication unit.

The processing unit is configured to store subscription data subscribed by the processing unit to the terminal device into a data server.

The communication unit is configured to receive a storage address of the subscription data from the data server.

The processing unit is further configured to store the storage address in a blockchain, where a first network device is located in the subscribed network of the terminal device.

The communication unit is further configured to send a permission credential to the blockchain, where the permission credential is used to verify permission to obtain the subscription data.

In an embodiment, when the communication apparatus is a terminal device, the communication apparatus may include a processing unit and a communication unit.

The communication unit is configured to receive a first random number sent by a first network device.

The processing unit is configured to generate a security token based on the first random number.

The communication unit is further configured to send the security token to a first network element, where the security token is used to verify permission to obtain subscription data, and the first network element is located in a roaming area of the terminal device.

In an embodiment, when the communication apparatus is a blockchain, the communication apparatus may include a processing unit and a communication unit.

The communication unit is configured to receive a query request from a first network element, where the query request includes a security token, and the security token is used to verify whether a second network element has permission to obtain subscription data.

The processing unit is configured to verify whether the security token is valid.

If the security token is valid, the processing unit is further configured to invoke a storage contract, to obtain address information of the subscription data.

The communication unit is further configured to return the address information of the subscription data to the first network element.

According to an eleventh aspect, an embodiment of this application provides a communication system. The communication system includes a network device in a visited network, a network device in a subscribed network, a terminal device, a blockchain, and a data server. The network device in the visited network may be configured to implement any one of the first aspect and the second aspect, or perform any method in the first aspect and the second aspect. The network device in the subscribed network may be configured to implement any one of the third aspect and the sixth aspect, or perform any method in the third aspect and the sixth aspect. The terminal device may be configured to implement the fourth aspect or perform the method in the fourth aspect. The blockchain may be configured to implement the fifth aspect or perform the method in the fifth aspect.

According to a twelfth aspect, this application provides a chip system, including a processor. Optionally, the chip system further includes a memory. The memory is configured to store a computer program, and the processor is configured to invoke the computer program from the memory and run the computer program, to enable a communication apparatus on which the chip system is installed to implement any one of the first aspect to the sixth aspect, or perform any method in the first aspect to the sixth aspect.

According to a thirteenth aspect, an embodiment of this application provides a computer storage medium. The computer storage medium stores instructions, and when the instructions are run on a computer, the computer is enabled to implement any one of the first aspect to the sixth aspect, or perform any method in the first aspect to the sixth aspect.

According to a fourteenth aspect, an embodiment of this application provides a computer program product including instructions. When the computer program product is run on a communication apparatus, the communication apparatus is enabled to implement any one of the first aspect to the sixth aspect, or perform any method in the first aspect to the sixth aspect.

DESCRIPTION OF EMBODIMENTS

The following describes in detail embodiments of this application with reference to the accompanying drawings.

Embodiments of this application provide a subscription data management method. Technical solutions of embodiments of this application may be applied to various communication systems, for example, a long term evolution (LTE) system, a worldwide interoperability for microwave access (WiMAX) communication system, a future 5th generation (5G) system such as a new radio access technology (NR), and a future communication system such as a 6G system.

The 5G system (which may also be referred to as a new radio system) is used as an example. Specifically, to ensure that a terminal device can smoothly perform communication in a visited network, permission to obtain subscription data is verified by using a blockchain in this application.

In this method, when a visited network device needs to obtain subscription data of a terminal device, the visited network device performs permission verification by using a blockchain, and obtains the subscription data after verification succeeds. This reduces interaction with a subscribed network device, and therefore reduces signaling overheads and power consumption of the subscribed network device. In addition, in the method, the visited network device obtains the subscription data without using the subscribed network device. Therefore, when the subscribed network device is faulty or in a sleep state, the visited network device can still successfully obtain the subscription data of the terminal device when meeting a condition for obtaining the subscription data. This ensures that the terminal device can smoothly perform communication in a visited network.

Further, the permission of the visited network device is verified by using the blockchain. This can effectively and securely record information about each procedure of applying for subscription data, ensure traceability, and improve security of a roaming service.

Figure 1:
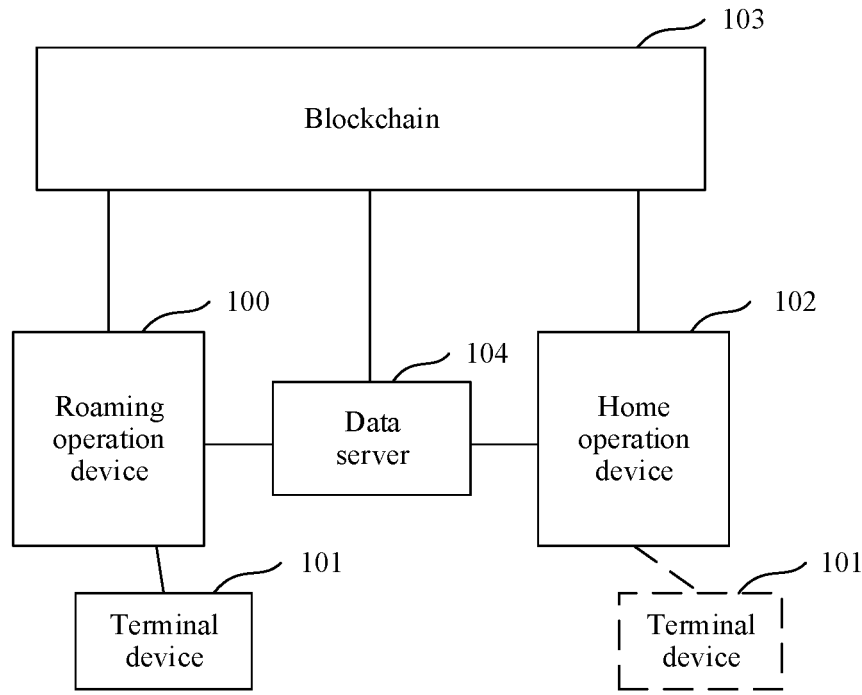
FIG. 1 is a diagram of an architecture of a communication system according to this application.

For ease of understanding embodiments of this application, a communication system shown in FIG. 1 is first used as an example to describe in detail a communication system to which embodiments of this application are applicable. As shown in FIG. 1, the communication system includes a network device 100 and a terminal device 101 in a visited network, and a network device 102, a blockchain 103, and a data server 104 in a subscribed network. For ease of description, in embodiments of this application, the network device in the visited network of the terminal device is referred to as a roaming operation device, and the network device in the subscribed network of the terminal device is referred to as a home operation device.

The roaming operation device 100, namely, the network device located in the visited network, is configured to: obtain subscription data between the terminal device 101 and the home operation device 102 when meeting a condition for obtaining the subscription data, and then provide a wireless communication function for the accessed terminal device 101 in the visited network. The roaming operation device 100 may further determine a roaming charge generated when the terminal device 101 performs communication in the visited network, notify the home operation device 102 of the roaming charge, and collect the roaming charge.

The roaming operation device 100 may also be referred to as a base station (base station, BS). Currently, for example, the roaming operation device 100 may be a next-generation base station (gNodeB, gNB), an evolved NodeB (eNB), a radio network controller (RNC), a NodeB (NB), a base station controller (BSC), a base transceiver station (BTS), a home base station (for example, a home evolved NodeB, or a home NodeB, HNB), a baseband unit (BBU), a transmission/reception point (TRP), a transmission point (TP), or a mobile switching center in 5G.

Further, network elements in the roaming operation device 100 mainly include a session management function (SMF), an access and mobility management function (AMF), a blockchain processing function (BCHF), and the like.

The terminal device 101 is a device that provides voice and/or data connectivity for a user, and may also be referred to as user equipment (UE), an access terminal device, a subscriber unit, a subscriber station, a mobile station, a mobile console, a remote station, a remote terminal device, a mobile device, a user terminal device, a terminal device, a wireless communication device, a user agent, or a user apparatus. In embodiments of this application, the terminal device may be a mobile phone, a tablet computer (Pad), a computer having a wireless transceiver function, a virtual reality (VR) terminal device, an augmented reality (AR) terminal device, a wireless terminal device in industrial control, a wireless terminal device in self driving (self driving), a wireless terminal device in telemedicine, a wireless terminal device in a smart grid, a wireless terminal device in transportation safety, a wireless terminal device in a smart city, a wireless terminal device in a smart home, or the like.

The home operation device 102 is a network device located in the subscribed network, and is configured to provide a wireless communication function for the accessed terminal device 101 in the subscribed network. The home operation device 102 is further configured to: account the roaming charge, sent by the roaming operation device 100, that is generated when the terminal device 101 performs a roaming service, and after determining that the roaming charge is correct, pay the roaming charge to the roaming operation device 100; and formulate and collect the roaming charge of the terminal device 101.

The home operation device 101 may also be referred to as a base station (base station, BS). Currently, for example, the home operation device 101 may be a next-generation base station (gNodeB, gNB), an evolved NodeB (eNB), a radio network controller (RNC), a NodeB (NB), a base station controller (BSC), a base transceiver station (BTS), a home base station (for example, a home evolved NodeB, or a home NodeB, HNB), a baseband unit (BBU), a transmission/reception point (TRP), a transmission point (TP), or a mobile switching center in 5G.

Further, network elements included in the home operation device 102 mainly include: an SMF, a BCHF, unified data management (UDM), and the like.

The blockchain 103 is a decentralized database that uses a block as a data structure, has a distributed storage and processing function, and is configured to: store related data information in the communication system, and update the stored data information based on received information, or return corresponding information based on received information. Each block in the blockchain includes a block body and a block header, and the block body stores a transaction record. The transaction record may be a transfer record, a smart contract record, a liquidation record, a data record, or the like based on a requirement of a specific application scenario. The block header stores a timestamp, a hash summary result of a transaction, and necessary information for forming a chain structure by using the block and a previous block, for example, a hash value of the previous block. This chain structure ensures that once a block is agreed by all nodes and added to respective block copies, the block cannot be modified, and can record a valid credential for each access.

The data server 104 has a storage and processing function, and is configured to: store related data information in the communication system, and update the stored data information based on received information, or return corresponding information based on received information.

The data server 104 in this embodiment of this application may be a database, and is configured to: store the subscription data in this embodiment of this application. When the subscription data is encrypted, the data server 104 may further be configured to store the encrypted subscription data.

A first network element in embodiments of this application may be a BCHF in the roaming operation device 100 or a BCHF in the blockchain 103. A second network element in embodiments of this application may be an AMF or an SMF in the roaming operation device 100.

The home operation device may be a first network device in embodiments of this application. In other words, the first network device may be one or more network elements in a home network (or referred to as a subscribed network), or may be one or more functional modules in the home network. A specific form and structure of the first network device are not limited in embodiments of this application.

The roaming operation device may be a second network device in embodiments of this application. In other words, the second network device may be one or more network elements in a roaming network (or referred to as a visited network), or may be one or more functional modules in the roaming network. A specific form and structure of the second network device are not limited in embodiments of this application.

A network architecture and a service scenario described in embodiments of this application are intended to describe the technical solutions in embodiments of this application more clearly, and do not constitute a limitation on the technical solutions in embodiments of this application. For example, the data server 104 may not be included in embodiments of this application, that is, the related information stored in the data server may be stored in the blockchain 103 in embodiments of this application. Therefore, a person of ordinary skill in the art may learn that as a network architecture evolves and a new service scenario emerges, the technical solutions in embodiments of this application are also applicable to a similar technical problem. It should be understood that FIG. 1 is merely a simplified schematic diagram used as an example for ease of understanding. The communication system may further include another network device or another terminal device that is not shown in FIG. 1.

Some terms in embodiments of this application are explained and described below for ease of understanding.

(1) A permission contract is essentially a program that runs in a blockchain and is driven by an event. The permission contract is certain, autonomous, observable, verifiable, and decentralized, has real-time performance, and is widely researched and applied in digital finance, big data, the Internet of things, and the like.

A blockchain-based permission contract includes data receiving, data processing, and state recording. When one or more pieces of input information received by a contract account meet a trigger condition of state transition, a contract action is selected based on preset information for automatic execution, and a current state is recorded. Therefore, as a computer technology, the permission contract can ensure enforcement of a contract without introducing a trusted third party, to ensure trustworthiness and security of a contract program.

Further, the permission contract in embodiments of this application includes a permission credential generated by a home operation device, and the permission credential is used to verify permission to obtain subscription data.

(2) A blockchain is a new application mode of a computer technology such as distributed data storage, point-to-point transmission, a consensus mechanism, or an encryption algorithm, and is essentially a decentralized database.

The blockchain technology does not depend on an additional third-party management organization or hardware facility, and has no central control. In addition to the self-contained blockchain, each node implements information verification, transmission, and management by the node through distributed accounting and storage. Decentralization is the most prominent and essential feature of the blockchain.

(3) A distributed ledger means that a transaction is jointly accounted by a plurality of nodes distributed at different places, and each node records complete account items. Therefore, the nodes can monitor validity of a transaction and jointly verify the transaction.

(4) A consensus mechanism means how all nodes reach a consensus to determine validity of a record, and is both a manner of identification and a manner of preventing tampering. The consensus mechanism has features of "the minority subordinate to the majority" and "equality".

"The minority subordinate to the majority" does not completely mean a quantity of nodes, but may also be a computing capability, a quantity of shares, or another feature quantity that can be compared by a computer. "Equality" means that when a node meets a condition, all nodes have the permission to preferentially propose a consensus result, which may be recognized by other nodes and finally become a final consensus result.

(5) A symmetric encryption algorithm is mainly an encryption algorithm that uses a same key for encryption and decryption. When the symmetric encryption algorithm is used for encrypted communication, a sender and a receiver need to negotiate a key before secure communication.

An encryption key can be deduced from a decryption key, and the decryption key may also be deduced from the encryption key. In most symmetric algorithms, an encryption key is the same as a decryption key. Therefore, the encryption algorithm is also referred to as a secret key algorithm or a single-key algorithm.

(6) An asymmetric encryption algorithm uses two different keys, namely, a public key (public key for short) for encryption and a private key (private key for short), for decryption. This algorithm has high security. The public key and the private key are a pair. If the public key is used to encrypt data, only the corresponding private key can be used to decrypt the data.

For example, Party A generates a pair of keys and publishes a public key. Party B that needs to send information to Party A uses the public key of Party A to encrypt confidential information, and then sends the information to Party A. Party A uses a private key of Party A to decrypt the encrypted information. When Party A wants to reply to Party B, Party A uses a public key of Party B to encrypt data. Similarly, Party B uses a private key of Party B to decrypt the data.

In addition, in embodiments of this application, the term "at least one" means one or more, and the term "a plurality of" means two or more. The term "and/or" describes an association relationship between associated objects and represents that three relationships may exist. For example, A and/or B may represent the following three cases: Only A exists, both A and B exist, and only B exists. A and B may be in a singular or plural form. The character "/" usually indicates an "or" relationship between the associated objects. "At least one of the following" or a similar expression thereof indicates any combination of these items, including a single item or any combination of a plurality of items. For example, at least one of a, b, or c may indicate: a, b, c, a and b, a and c, b and c, or a, b, and c, where a, b, and c may be singular or plural.

Unless otherwise stated, ordinal numbers such as "first" and "second" mentioned in embodiments of this application are intended to distinguish a plurality of objects, rather than limit an order, a time sequence, priorities, or importance degrees of the plurality of objects.

In addition, the terms "include/comprise" and "have" in embodiments, claims, and accompanying drawings of this application are not exclusive. For example, a process, method, system, product, or device including a series of steps or modules is not limited to the listed steps or modules, and may further include a step or module that is not listed.

Figure 2:
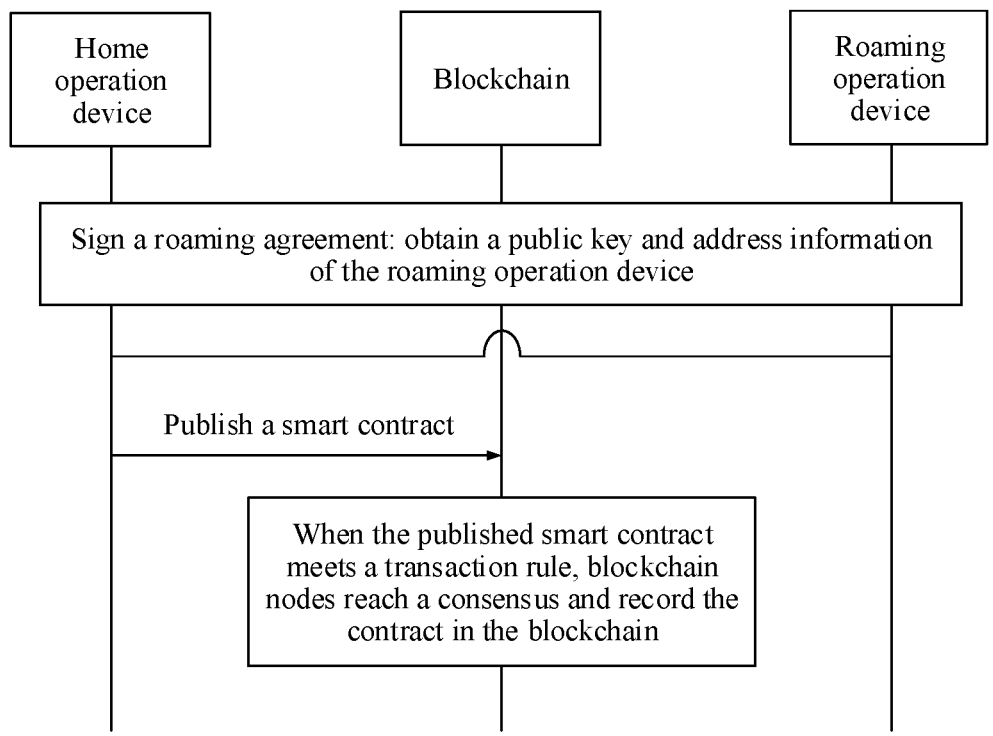
FIG. 2 is a schematic diagram in which a roaming operation device signs a roaming agreement with a home operation device according to this application.

As shown in FIG. 2, in embodiments of this application, before obtaining the subscription data between the home operation device and the terminal device, the roaming operation device needs to sign a roaming agreement with the home operation device. In this process, the home operation device obtains a public key (for example, a public key PK_v) of the roaming operation device and address information (for example, address information acc_v) of the roaming operation device. Based on this, the home operation device publishes a smart contract to grant permission to the roaming operation device. In addition, when the contract meets a transaction rule, blockchain nodes reach a consensus and record the contract in a chain.

In embodiments of this application, the smart contract may be referred to as a permission contract, and the address information (for example, acc_v) of the roaming operation device is recorded in the permission contract.

Further, a private key corresponding to a public key (for example, PK_v) of the roaming operation device is stored in a security network element of a roaming operator in embodiments of this application. The BCHF in embodiments of this application may be used as a network element that secretly stores and maintains the private key of the roaming operation device.

With reference to the accompanying drawings, the following specifically describes a subscription data management method in this application in two aspects: A terminal device subscribes to a home operation device, and a roaming operation device obtains subscription data of the terminal device.

Embodiment 1: A Terminal Device Subscribes to a Home Operation Device

Figure 3:
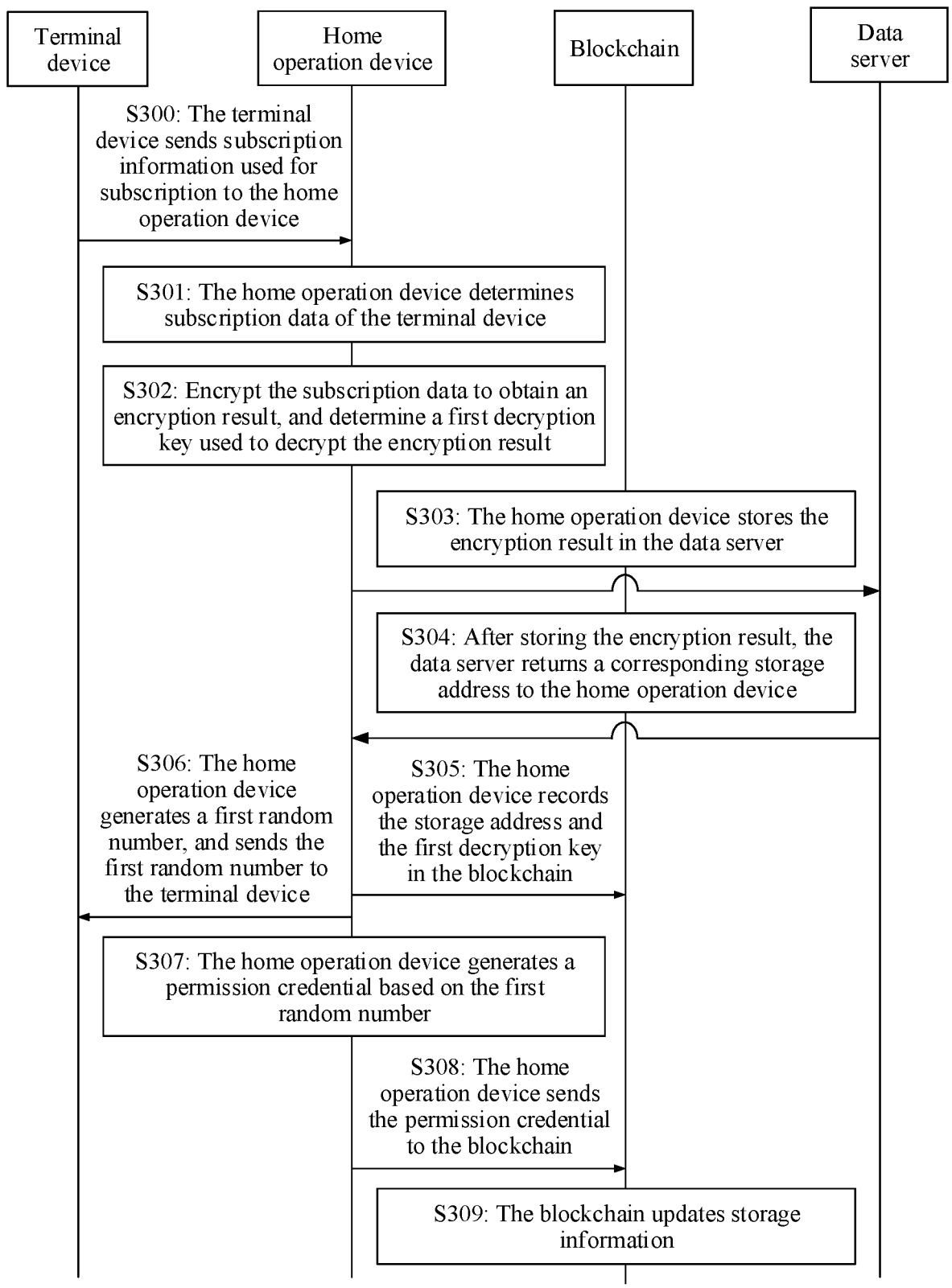
FIG. 3 is a flowchart diagram in which a terminal device subscribes to a home operation device according to this application.

When the terminal device becomes a subscriber of the home operation device, the home operation device subscribes to the terminal device based on information provided by the terminal device, and stores subscription data. A specific interaction procedure may be shown in FIG. 3, and specifically include the following steps.

S300: The terminal device sends subscription information used for subscription to the home operation device.

The subscription information includes necessary information, used for subscription, that is provided by the terminal device. In addition, if the subscription information includes information such as identity validity and real-name authentication of the terminal device, the information such as identity validity and real-name authentication may be used as a part of the subscription data.

Optionally, in this embodiment of this application, the terminal device sends a second random number to the home operation device, and the second random number is used to generate a permission credential.

The terminal device may add the second random number to the subscription information, and send the subscription information to the home operation device. Alternatively, the terminal device may separately send the second random number to the home operation device.

S301: The home operation device determines the subscription data of the terminal device.

S302: The home operation device encrypts the subscription data to obtain an encryption result, and determines a first decryption key used to decrypt the encryption result.

In this embodiment of this application, the home operation device may encrypt the subscription data in any manner.

For example, if the home operation device encrypts the subscription data by using a symmetric encryption algorithm, the first decryption key is both an encryption key used to encrypt the subscription data and a decryption key used to decrypt the encryption result to obtain the subscription data.

For another example, if the home operation device encrypts the subscription data by using an asymmetric algorithm, the first decryption key is a private key used for decryption in the asymmetric algorithm. The home operation device encrypts the subscription data by using a public key corresponding to the private key.

It should be noted that step S302 is an unnecessary step and may be omitted. In other words, in this embodiment of this application, the home operation device may directly store the subscription data in a data server, that is, the subscription data stored in the data server is not encrypted.

S303: The home operation device stores the encryption result in the data server.

The encryption result is stored in the data server in this embodiment of this application. This can save a storage resource of a blockchain, and effectively reduce storage load of the blockchain.

S304: After storing the encryption result, the data server returns a corresponding storage address to the home operation device.

It should be noted that when the data server stores the subscription data of the terminal device in this embodiment of this application, the subscription data corresponding to the terminal device may be subscription data related to a plurality of different services. For example, as shown in Table 1, it is assumed that subscription data corresponding to a terminal device A is subscription data A, subscription data B, and subscription data C. The subscription data A may be subscription data related to authentication and mobility management, the subscription data B may be subscription data related to session management, and the subscription data C may be subscription data related to policy control.

TABLE 1

| Subscription data corresponding to a terminal device | |
| --- | --- |
| Terminal device A | Subscription data A |
|  | Subscription data B |
|  | Subscription data C |

For the subscription data, corresponding to the terminal device A, related to different services, all subscription data corresponding to the terminal device A may be stored at a same address, or subscription data corresponding to the terminal device A may be stored at different addresses.

For example, if the subscription data needs to be encrypted for storage, the subscription data A, the subscription data B, and the subscription data C may be encrypted as a whole, and an encryption result is stored in the data server. If the subscription data does not need to be encrypted for storage, the subscription data A, the subscription data B, and the subscription data C may be stored at a same address of the data server.

For example, if the subscription data needs to be encrypted for storage, the subscription data A, the subscription data B, and the subscription data C may be separately encrypted to obtain an encryption result A, an encryption result B, and an encryption result C, and the three encryption results are stored at different addresses of the data server.

For example, the encryption result A is stored at an address 1, and the encryption result B and the encryption result C are stored at an address 2. Alternatively, the encryption result A is stored at an address 1, the encryption result B is stored at an address 2, and the encryption result C is stored at an address 3. After storing the encryption result, the data server returns, to the home operation device, a list that is of storage paths of the subscription data and that corresponds to the terminal device.

Similarly, if the subscription data does not need to be encrypted for storage, the subscription data A, the subscription data B, and the subscription data C may be directly stored at different addresses of the data server. After storing the subscription data, the data server returns, to the home operation device, a list that is of the storage addresses of the subscription data and that corresponds to the terminal device.

S305: The home operation device records the storage address and the first decryption key in the blockchain.

In an optional manner of this embodiment of this application, the storage address and the first decryption key may be stored in the blockchain as a whole, or may be separately stored in the blockchain.

The storage address is used by a roaming operation device to obtain the subscription data (the encryption result) from the data server, and the first decryption key is used to decrypt the obtained encryption result to obtain the subscription data.

S306: The home operation device generates a first random number, and sends the first random number to the terminal device.

In this embodiment of this application, the first random number is used to generate the permission credential, and the home operation device sends the first random number to the terminal device. The terminal device generates a security token based on the first random number, and the security token is used to verify permission to obtain the subscription data.

S307: The home operation device generates the permission credential based on the first random number.

The home operation device generates the permission credential in a plurality of manners in this embodiment of this application. Specific manners are limited to the following several manners.

Generation manner 1: The home operation device generates the permission credential based on the first random number. For example, it is assumed that the first random number is non_H. The home operation device generates the permission credential based on the random number non_H.

For example, the permission credential generated by the home operation device is h_UE=Hash2{non_H}.

Generation manner 2: The home operation device generates the permission credential based on the first random number and the second random number. For example, it is assumed that the first random number is non_H, and the second random number is non_UE. The home operation device generates the permission credential based on the random number non_UE and the random number non_H.

For example, the permission credential generated by the home operation device is h_UE=Hash2{non_UE∥non_H}.

Generation manner 3: The home operation device generates the permission credential based on identity information of the roaming operation device, the first random number, and the second random number.

The identity information of the roaming operation device may be a vehicle identifier of the roaming operation device, or may be an address of the roaming operation device. For example, the identity information of the roaming operation device is the vehicle identifier VID, the first random number is non_H, the second random number is non_UE, and the permission credential is generated.

The vehicle identifier of the roaming operation device is obtained by the home operation device according to a roaming agreement with the roaming operation device.

For example, the permission credential generated by the home operation device is h_UE=Hash2 {non_UE∥non_H∥VID}.

S308: The home operation device sends the permission credential to the blockchain.

Optionally, the home operation device invokes a permission contract stored in the blockchain, where the permission contract is a permission contract corresponding to the home operation device and the roaming operation device. The home operation device adds the permission credential to the permission contract, and sends, to the blockchain, the permission contract to which the permission credential is added.

Optionally, the home operation device directly sends the permission credential to the blockchain.

S309: The blockchain updates storage information.

Optionally, after receiving the permission contract to which the permission credential is added, the blockchain updates the permission contract corresponding to the home operation device and the roaming operation device to the permission contract to which the permission credential is added.

Alternatively, after receiving the permission credential sent by the home operation device, the blockchain adds the permission credential to the permission contract corresponding to the home operation device and the roaming operation device, and updates the permission contract.

Alternatively, after receiving the permission credential sent by the home operation device, the blockchain locally stores the permission credential, and then updates the storage information of the blockchain.

It should be noted that in the interaction procedure shown in FIG. 2 in this embodiment of this application, a sequence of some steps is not limited. For example, S306 may be performed before S301.

Further, the storage address and the first decryption key may be encrypted again in this embodiment of this application, to better ensure security of the subscription data.

For example, the home operation device performs double encryption on the storage address and the first decryption key in this embodiment of this application.

It is assumed that the storage address is add_UE, and the first decryption key is PK_UE. Therefore, during encryption, asymmetric encryption may be first performed on the storage address and the first decryption key.

For example, a first encryption process is performed on the storage address add_UE and the first decryption key PK_UE according to the following formula 1:

$$M\_lv = E\_asy\{PK\_v, add\_UE\|PK\_UE\} \quad \text{formula 1}$$

In the formula 1, a first element in brackets indicates a key (namely, a public key in asymmetric encryption) used by the encryption algorithm, a second element indicates encrypted content, and M_lv indicates an encryption result of the first encryption process.

Then, symmetric encryption is performed on the encryption result M_lv obtained through the first encryption process. For example, the encryption result M_lv obtained through encryption is encrypted again according to the following formula 2:

$$M\_v = E\_sym\{K, M\_lv\} \quad \text{formula 2}$$

In the formula 2, a first element in brackets indicates a key (the key is both an encryption key and a decryption key) used by the symmetric encryption algorithm, and a second element indicates encrypted content.

Optionally, K may be determined by using the following formula 3:

$$K = Hash\{non\_UE\|non\_H\} \quad \text{formula 3}$$

It should be noted that in a process of performing double encryption on the storage address add_UE and the first decryption key PK_UE in this embodiment of this application, symmetric encryption and asymmetric encryption may be not subject to a specific sequence. For example, symmetric encryption is first performed, and then asymmetric encryption is performed on a result of symmetric encryption.

If the storage path add_UE is a path list, each element in the list is encrypted to generate a plurality of M_v, to form an M_v list.

Embodiment 2: A Process of Obtaining the Subscription Data in a Roaming Process

Based on Embodiment 1, there may be two cases in which the roaming operation device obtains the subscription data in this embodiment of this application.

Case 1: An AMF network element in the roaming operation device obtains the subscription data. Case 2: An SMF network element in the roaming operation device obtains the subscription data. The following separately describes the two cases.

To avoid redundancy caused by repeated description, no repeated limitation is imposed on description of related examples in Embodiment 2.

For example, it can be learned from Embodiment 1 that a storage address in Embodiment 2 indicates an address of the subscription data or an address of an encryption result of the subscription data in the data server. The first decryption key indicates the key used to decrypt the encryption result of the subscription data. M_lv indicates the encryption result of the first encryption process performed by the home operation device on the storage address and the first decryption key.

M_v indicates the encryption result of the second encryption process performed by the home operation device based on M_lv. PK_v indicates the public key used by the home operation device to perform asymmetric encryption. K indicates the key used by the home operation device to perform symmetric encryption. non_H indicates the first random number generated by the home operation device. non_UE indicates the second random number generated by the terminal device.

Figure 4A:
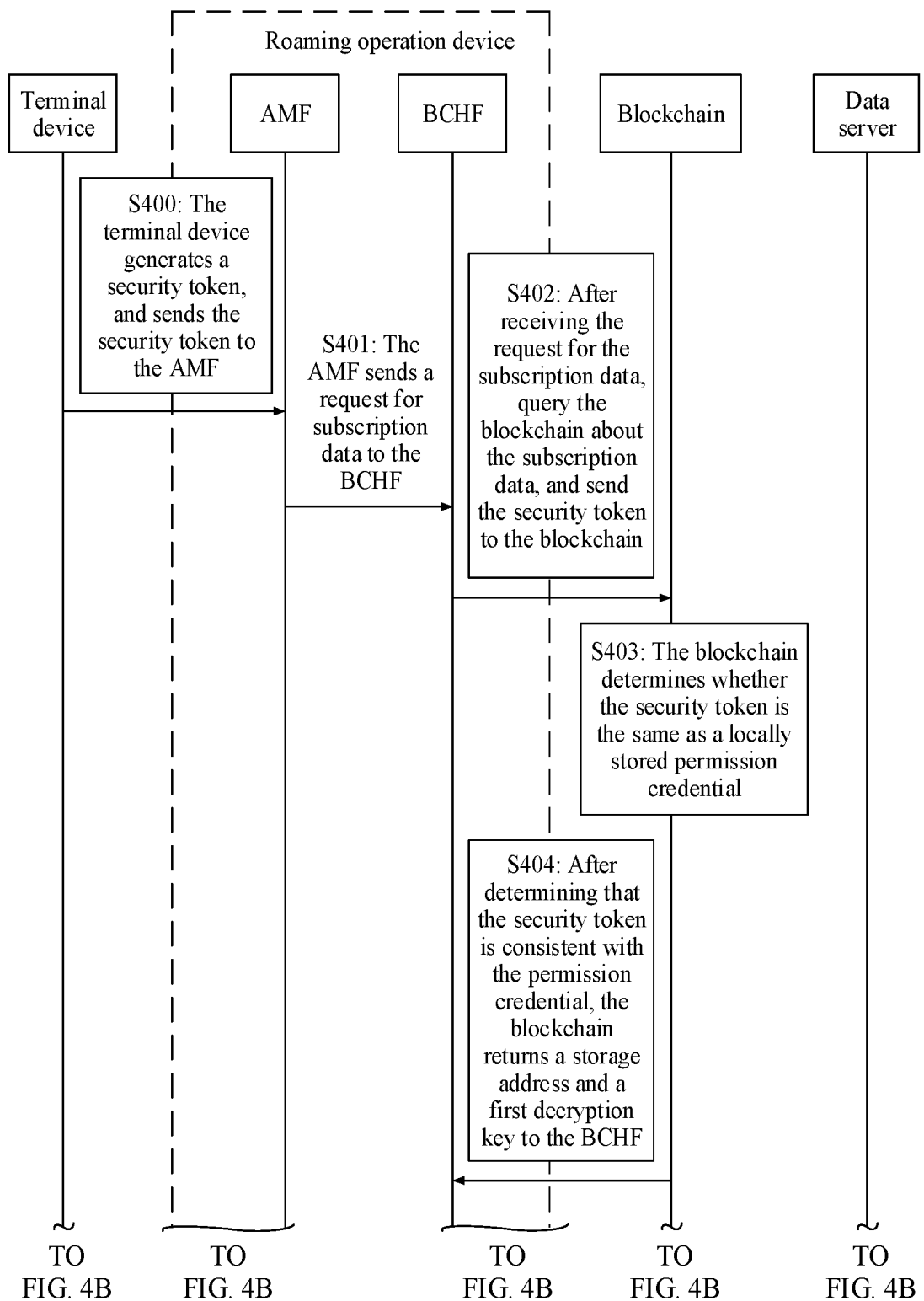
FIG. 4A and FIG. 4B are a flowchart diagram in which an AMF network element performs access control on subscription data in a roaming process according to this application.
Figure 4B:
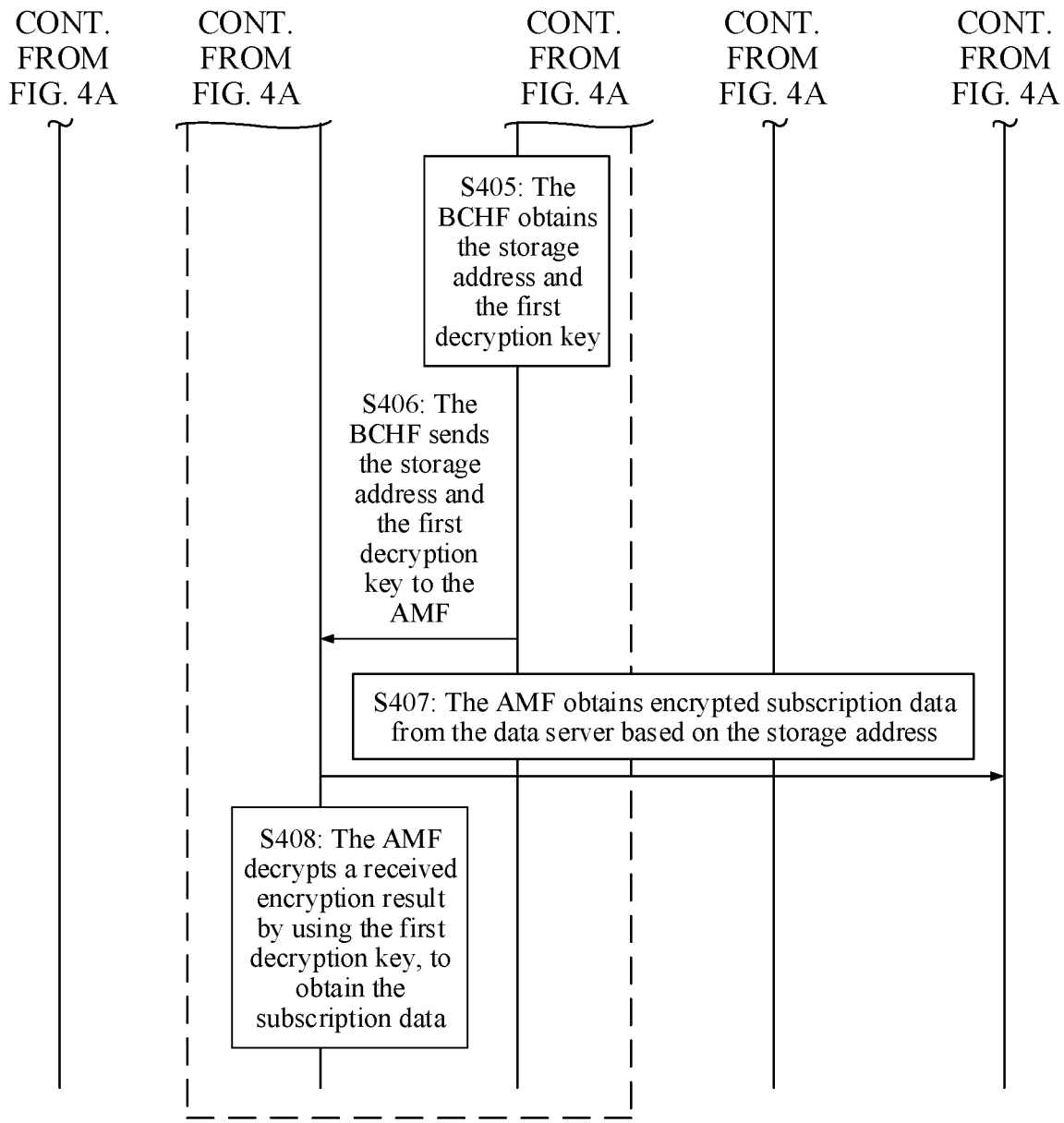

Case 1: FIG. 4A and FIG. 4B are a process in which the AMF network element in the roaming operation device performs access control on the subscription data of the terminal device. A specific procedure includes the following steps.

S400: The terminal device generates the security token, and sends the security token to the AMF.

For example, the terminal device may generate the security token in the following manner:

The terminal device generates the security token based on the generated second random number non U and the first random number non_H sent by the home operation device.

For example, it is assumed that the security token is token, and the terminal device generates token according to the following formula 4:

$$token = Hash\{non\_UE || non\_H\} \qquad \text{formula 4}$$

For example, the terminal device may generate the security token in the following manner:

The terminal device generates the security token token based on the generated second random number non U, the first random number non_H sent by the home operation device, and the identity information of the roaming operation device.

It is assumed that the identity information of the roaming operation device is a vehicle identifier VID, and token is generated according to the following formula 5:

$$token = Hash\{non\_UE || non\_H || VID\} \qquad \text{formula 5}$$

A process in which the terminal device generates the security token may be completed in a security module, for example, a universal subscriber identity module (USIM), of the terminal device. Then, the security token is transferred to the AMF through a non-access stratum (NAS) channel.

Optionally, if the home operation device performs double encryption on the storage address and the first decryption key, to obtain M_v, the terminal device further needs to determine K. Then, the terminal device transfers K to the AMF, so that the roaming operation device decrypts M_v by using K and a private key corresponding to the public key PK_v.

S401: The AMF sends a request for the subscription data to a BCHF.

Optionally, when the AMF needs to provide the security token for the BCHF, the AMF sends the security token to the BCHF. If double encryption is performed, when the AMF needs to send K to the BCHF, the AMF sends K received from the terminal device to the BCHF.

There are a plurality of cases in which the AMF needs to provide the security token for the BCHF, and the cases specifically include but are not limited to the following several cases.

Case 1 of providing the security token (which may further include K):

After receiving information, sent by the BCHF, about obtaining the security token (which may further include K), the AMF sends the security token (which may further include K) to the BCHF.

Case 2 of providing the security token (which may further include K):

When sending the request for the subscription data to the BCHF, the AMF sends information about the security token (which may further include K) to the BCHF. The security token (which may further include K) may be carried in the request for the subscription data.

S402: After receiving the request for the subscription data, the BCHF queries the blockchain about the subscription data, and sends the security token to the blockchain.

In an optional manner of this embodiment of this application, the BCHF in the roaming operation device deletes the received security token (which may further include K) in the BCHF at each interval of threshold duration.

Therefore, when the AMF sends, by using the BCHF, the request for the subscription data to the blockchain for the first time, the BCHF does not have verification information. Therefore, the AMF further needs to send the security token to the BCHF. Therefore, when querying the blockchain about the subscription data, the BCHF sends the security token to the blockchain, so that the blockchain verifies, based on the security token, whether the roaming operation device has the permission to obtain the subscription data.

If it is not the first time that the AMF sends the request for the subscription data to the BCHF, and time for the BCHF to delete the security token (which may further include K) does not arrive, the BCHF stores the security token (which may further include K). Therefore, when querying the blockchain about the subscription data, the BCHF may directly send the security token stored by the BCHF to the blockchain, so that the blockchain verifies, based on the security token, whether the roaming operation device has the permission to obtain the subscription data.

If it is not the first time that the AMF sends the request for the subscription data to the BCHF, and the BCHF has deleted the security token (which may further include K) in the BCHF, when querying the blockchain about the subscription data, the BCHF further needs to send a request for the security token to the AMF, and obtains the security token sent by the AMF. Therefore, when querying the blockchain about the subscription data, the BCHF sends the security token to the blockchain, so that the blockchain verifies, based on the security token, whether the roaming operation device has the permission to obtain the subscription data.

S403: The blockchain determines whether the security token is the same as the locally stored permission credential.

Optionally, the blockchain processes the security token, and then compares an obtained processing result with the permission credential. For example, the blockchain processes the security token according to the following formula 6, to obtain a processing result token_v, and compares token_v with the permission credential.

$$token\_v = Hash\{Hash\{non\_UE || non\_H || VID\}\} \qquad \text{formula 6}$$

For example, in this embodiment of this application, if the blockchain determines that the processing result is different from the permission credential, the blockchain determines that the roaming operation device does not have the permission to obtain the subscription data, and a program ends. On the contrary, if the blockchain determines that the processing result is the same as the permission credential, the blockchain determines that the roaming operation device has the permission to obtain the subscription data.

S404: After determining that the security token is consistent with the permission credential, the blockchain returns the storage address and the first decryption key in the blockchain to the BCHF.

If the storage address stored in the blockchain is a list in this embodiment of this application, the blockchain returns some addresses that are allowed to be obtained during query and the corresponding first decryption key.

S405: The BCHF obtains the storage address and the first decryption key.

In this embodiment of this application, if the BCHF obtains, from the blockchain, information on which double encryption is performed, namely, M_v, the BCHF further needs to decrypt M_v, to obtain the storage address and the first decryption key.

For example, a process of decrypting M_v corresponds to the previous encryption process in this embodiment of this application. For example, M_v is decrypted according to a formula 7, to obtain the storage address add_UE and the first decryption key PK_UE in M_v.

$$\text{add\_UE} \| \text{K\_UE} = \text{D\_sym}\{K, \text{D\_asy}\{\text{SK\_v}, \text{M\_v}\}\} \quad \text{formula 7}$$

SK_v in the formula 7 is the private key of the roaming operation device stored in the BCHF.

S406: The BCHF sends the storage address and the first decryption key to the AMF.

S407: The AMF obtains the encryption result from the data server based on the storage address.

S408: The AMF decrypts the received encryption result by using the first decryption key, to obtain the subscription data.

Figure 5A:
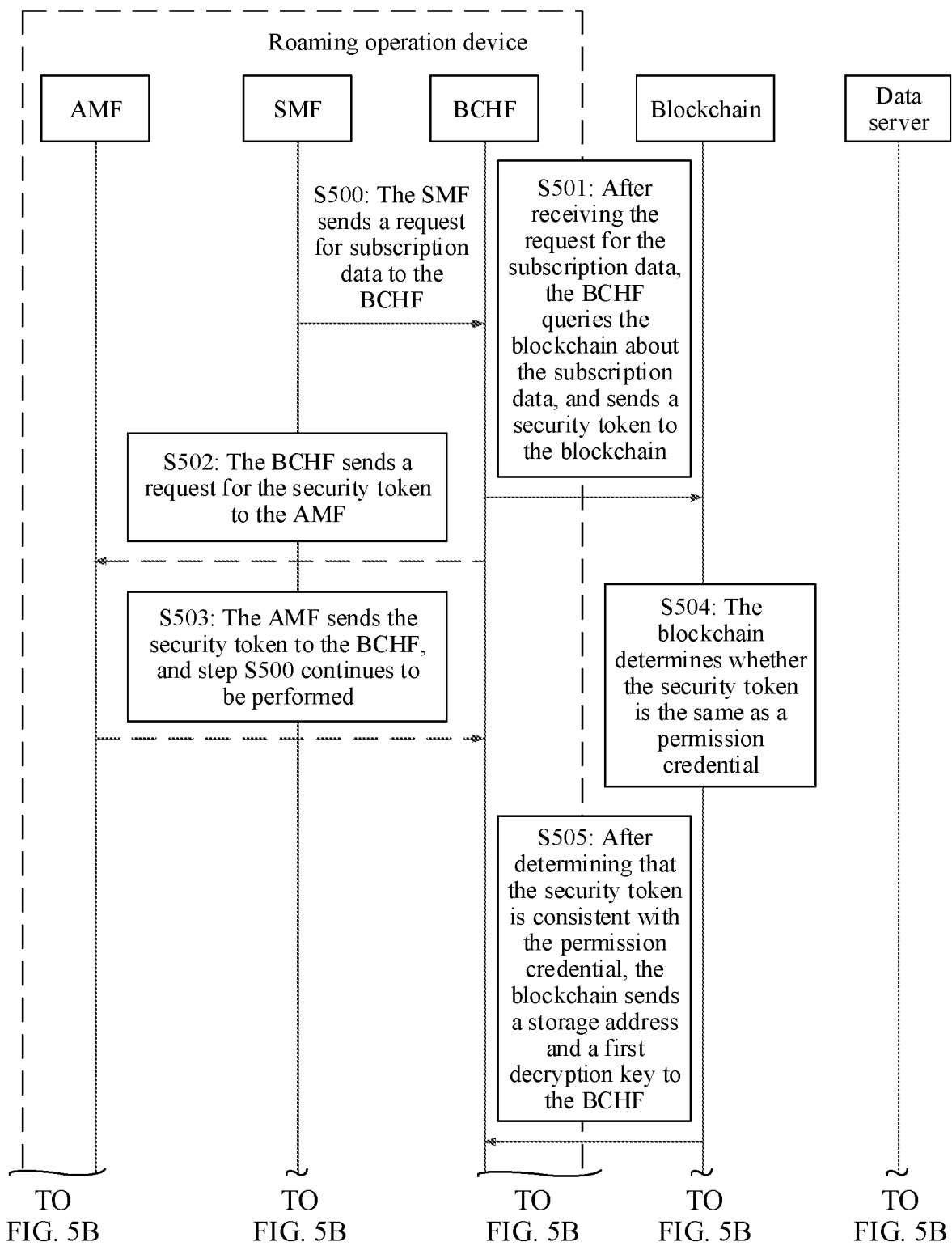
FIG. 5A and FIG. 5B are a schematic diagram in which an SMF network element performs access control on subscription data in a roaming according to this application.
Figure 5B:
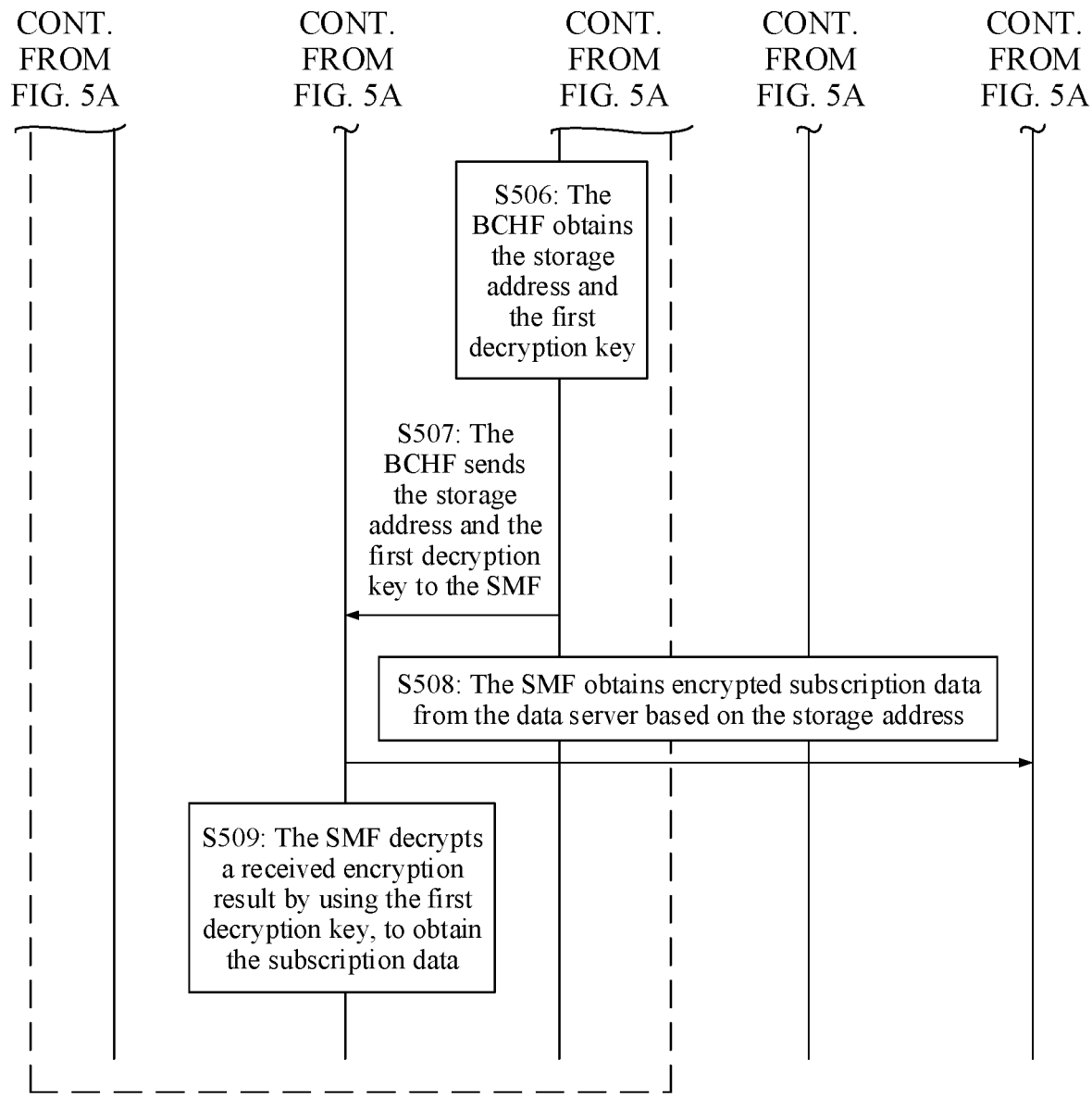

Case 2: Based on Case 1, FIG. 5A and FIG. 5B are a process in which the SMF network element or another network element in the roaming operation device performs access control on the subscription data of the terminal device. The following describes a specific procedure by using the SMF network element as an example.

S500: The SMF sends the request for the subscription data to the BCHF.

S501: After receiving the request for the subscription data, the BCHF queries the blockchain about the subscription data, and sends the security token to the blockchain.

It should be noted that the BCHF in the roaming operation device deletes the received security token in the BCHF at each interval of threshold duration this embodiment of this application. Therefore, when the SMF queries the blockchain about the subscription data by using the BCHF, if the BCHF stores the security token, when querying the blockchain about the subscription data, the BCHF directly obtains the security token locally, and sends the security token to the blockchain, so that the blockchain determines, based on the security token, whether the roaming operation device has the permission to obtain the subscription data. In other words, step S504 continues to be performed.

However, if the BCHF does not store the security token, the BCHF further needs to perform step S502.

S502: The BCHF sends the request for the security token to the AMF.

S503: The AMF sends the security token to the BCHF, and step S501 continues to be performed.

S504: The blockchain determines whether the security token is the same as the permission credential.

S505: After determining that the security token is consistent with the permission credential, the blockchain returns the storage address and the first decryption key in the blockchain to the BCHF.

If the storage address stored in the blockchain is a list in this embodiment of this application, the blockchain returns some addresses that are allowed to be obtained during query and the corresponding first decryption key.

S506: The BCHF obtains the storage address and the first decryption key.

In this embodiment of this application, if the BCHF obtains, from the blockchain, information on which double encryption is performed, namely, M_v, the BCHF decrypts M_v, to obtain the storage address and the first decryption key.

S507: The BCHF sends the storage address and the first decryption key to the SMF.

S508: The SMF obtains the encryption result from the data server based on the storage address.

S509: The SMF decrypts the received encryption result by using the decryption key, to obtain the subscription data.

In the subscription data management method, the permission contract in the blockchain is configured, so that the home operation device does not need to participate in subscription data management all the time. This effectively reduces load of the home operation device. However, based on the blockchain technology, each data access event can be effectively recorded when the home operator device is offline. In addition, security of the subscription data is ensured in a manner of cryptography in this embodiment of this application, and neither an unlicensed operator nor another entity can obtain content of the subscription data. Even if an online database is attacked or the encrypted subscription data in the database is obtained in another manner, the encrypted subscription data is still in a ciphertext format that cannot be decrypted when a given access condition is not met.

Further, in this application, Embodiment 2 is further optimized based on same security and function performance.

In an optional embodiment of this application, the method for obtaining the subscription data is further optimized mainly based on a consensus mechanism of a threshold.

In other words, in this embodiment of this application, the subscription data stored in the data server can be obtained only when the roaming operation device receives a subscription data response message whose quantity is greater than or equal to a threshold.

The blockchain has a plurality of management nodes, and the subscription data response message is sent by the management node to the roaming operation device after the management node determines that the permission credential is consistent with the verification information. The subscription data response message includes a message of a storage address fragment, where the storage address fragment indicates partial information of the storage address.

In other words, the subscription data response message does not include the complete storage address of the subscription data in the data server. Only when the roaming operation device receives a subscription data response message whose quantity is greater than or equal to the threshold, the complete storage address can be determined based on a partial fragment message in the obtained subscription data response message. Then, the subscription data is obtained from the data server based on the complete storage address.

It should be noted that another transaction or contract invoking in the blockchain may be or may not be performed based on the consensus mechanism.

For example, the plurality of management nodes in the blockchain receives the request for the subscription data from the BCHF. After determining that the roaming operation device has the permission to obtain the subscription data, the management node sends node information f(index_bc) of the management node and the storage address fragment to the BCHF.

After the BCHF receives the subscription data response message, there are a plurality of cases in which the BCHF determines, based on the subscription data response message, whether the subscription data can be obtained.

Case 1: If a quantity of different node information f(index_bc) received by the BCHF in preset duration is less than a threshold t, it is determined that the roaming operation device has no permission to invoke the subscription data in the data server, and a process ends.

The blockchain records a successful execution log of the invoking process.

Case 2: If a quantity of different node information f(index_bc) received by the BCHF in preset duration is greater than or equal to t, the roaming operation device obtains the storage address fragment from the received subscription data response message, then determines the complete storage address based on the storage address fragment, and finally obtains the subscription data from the data server based on the complete storage address.

For example, it is assumed that the threshold is 3, and the roaming operation device receives, in the preset duration, subscription data response messages sent by four blockchain management nodes. For example, a management node 1 sends a subscription data response message 1, where the subscription data response message includes a storage address fragment 1. A management node 2 sends a subscription data response message 2, where the subscription data response message includes a storage address fragment 2. A management node 3 sends a subscription data response message 3, where the subscription data response message includes a storage address fragment 3. A management node 4 sends a subscription data response message 4, where the subscription data response message includes a storage address fragment 4.

Because a quantity of subscription data response messages received by the roaming operation device from the management nodes is greater than 3, a process may continue to be performed.

The roaming operation device may determine the complete storage address fragment based on storage address fragments in all received subscription data response messages. Alternatively, the roaming operation device may select a quantity of subscription data response messages from all the received subscription data response messages, where the quantity is equal to the threshold, and then determine the complete storage address fragment based on a storage address fragment in the selected subscription data response message.

For example, the roaming operation device selects the storage address fragment 1, the storage address fragment 3, and the storage address fragment 4, and then determines the complete storage address based on the selected three storage address fragments. Finally, the roaming operation device obtains the subscription data from the data server based on the complete storage address.

The blockchain records a successful execution log of the invoking process.

Figure 6:
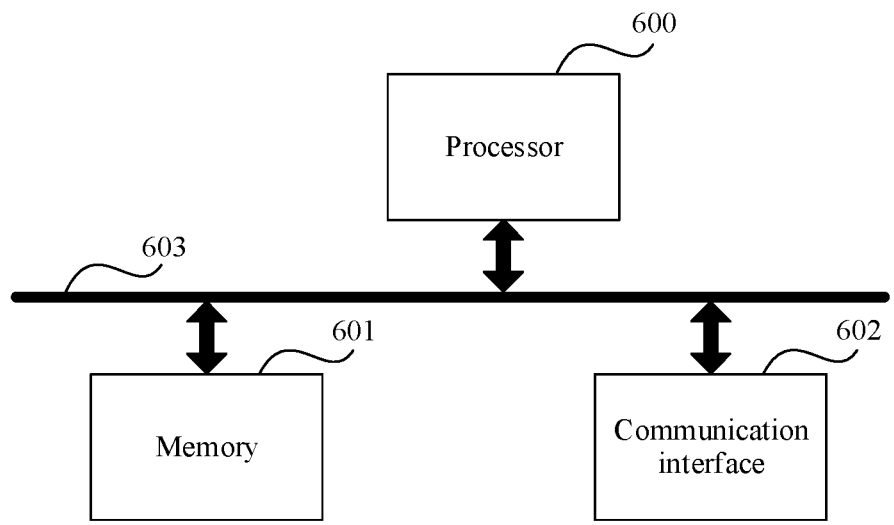
FIG. 6 is a schematic diagram of a network element in a first visited network according to this application.

Based on the embodiments, as shown in FIG. 6, this application provides a network element. The network element is located in a roaming network, and includes a processor 600, a memory 601, and a communication interface 602.

The processor 600 is responsible for managing a bus architecture and general processing, and the memory 601 may store data used when the processor 600 performs an operation. The transceiver communication interface 602 is configured to receive and send data under control of the processor 600, to perform data communication with the memory 601.

The processor 600 may be a central processing unit (CPU), a network processor (network processor, NP), or a combination of a CPU and an NP. The processor 600 may further include a hardware chip. The hardware chip may be an application-specific integrated circuit (ASIC), a programmable logic device (PLD), or a combination thereof. The PLD may be a complex programmable logic device (CPLD), a field programmable gate array (FPGA), a generic array logic (GAL), or any combination thereof. The memory 601 may include any medium that can store program code, such as a USB flash drive, a removable hard disk, a read-only memory (ROM), a random access memory (RAM), a magnetic disk, or an optical disc.

The processor 600, the memory 601, and the communication interface 602 are connected to each other. Optionally, the processor 600, the memory 601, and the communication interface 602 are connected to each other by using a bus 603. The bus 603 may be a peripheral component interconnect (PCI) bus, an extended industry standard architecture (EISA) bus, or the like. The bus may be classified into an address bus, a data bus, a control bus, or the like. For ease of indication, the bus is indicated by using only one bold line in FIG. 6. However, it does not indicate that there is only one bus or only one type of bus.

Specifically, the processor 600 is configured to read a program in the memory 601 to:

receive, from a second network element, a request message through the communication interface, where the second network element is located in a roaming area of a terminal device, and the request message is used to request subscription data of the terminal device; obtain a security token of the terminal device, where the security token is used to verify whether the second network element has permission to obtain the subscription data; provide the security token for a blockchain, and query the blockchain about the subscription data; and if verification succeeds, obtain address information of the subscription data from the blockchain, and send the address information of the subscription data to the second network element.

In an embodiment, the processor 600 is specifically configured to:

obtain the security token locally; or receive the security token sent by the second network element.

In an embodiment, the processor 600 is specifically configured to:

provide an identifier of the terminal device for the blockchain, where the identifier of the terminal device is used to determine the subscription data corresponding to the terminal device.

In an embodiment, the processor 600 is further configured to:

decrypt the address information of the subscription data, to obtain a storage address of the subscription data in a database.

In an embodiment, a first network element is a blockchain handling function BCHF in a roaming network or a BCHF in the blockchain.

In an embodiment, the second network element is an access and management function AMF or a session management function SMF in the roaming network.

In an embodiment, the processor 600 is specifically configured to:

invoke a permission contract stored in the blockchain, to query the subscription data.

Figure 7:
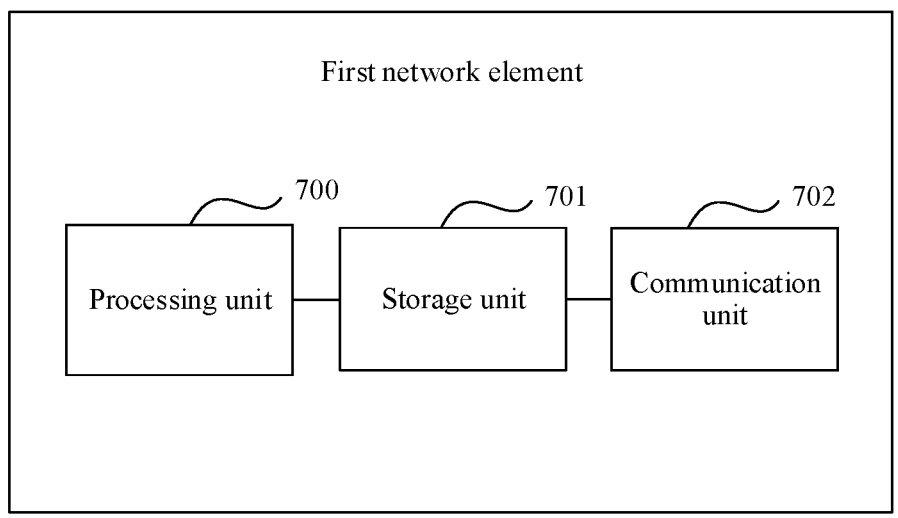
FIG. 7 is a schematic diagram of a network element device in a second visited network according to this application.

As shown in FIG. 7, this application provides a network element. The network element is located in a subscribed network, and includes: at least one processing unit 700, at least one storage unit 701, and at least one communication unit 702. The communication unit 702 is configured to receive and send data under control of the processing unit 700, the storage unit 701 stores program code, and when the program code is executed by the processing unit 700, the processing unit 700 is configured to:

receive, from a second network element, a request message through the communication unit, where the second network element is located in a roaming area of a terminal device, and the request message is used to request subscription data of the terminal device; obtain a security token of the terminal device, where the security token is used to verify whether the second network element has permission to obtain the subscription data; provide the security token for a blockchain, and query the blockchain about the subscription data; and if verification succeeds, obtain address information of the subscription data from the blockchain, and send the address information of the subscription data to the second network element.

In an embodiment, the processing unit 700 is specifically configured to:

obtain the security token locally; or receive the security token sent by the second network element.

In an embodiment, the processing unit 700 is specifically configured to:

provide an identifier of the terminal device for the blockchain, where the identifier of the terminal device is used to determine the subscription data corresponding to the terminal device.

In an embodiment, the processing unit 700 is further configured to:

decrypt the address information of the subscription data, to obtain a storage address of the subscription data in a database.

In an embodiment, a first network element is a blockchain handling function BCHF in a roaming network or a BCHF in the blockchain.

In an embodiment, the second network element is an access and management function AMF or a session management function SMF in the roaming network.

In an embodiment, the processing unit 700 is specifically configured to:

invoke a permission contract stored in the blockchain, to query the subscription data.

Figure 8:
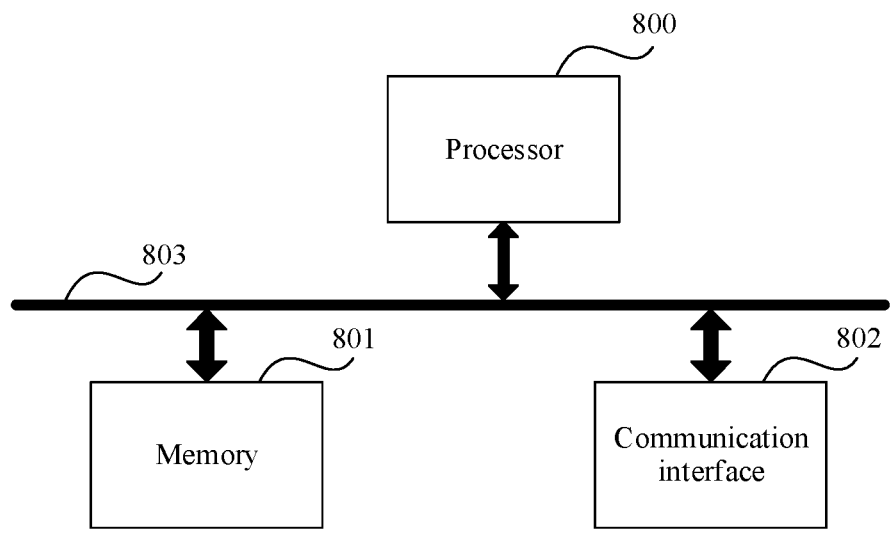
FIG. 8 is a schematic diagram of a network device in a first subscribed network according to this application.

As shown in FIG. 8, an embodiment of this application further provides a network device. The network device is located in a subscribed network of a terminal device, and includes a processor 800, a memory 801, and a communication interface 802.

The processor 800 is responsible for managing a bus architecture and general processing, and the memory 801 may store data used when the processor 800 performs an operation. The transceiver communication interface 802 is configured to receive and send data under control of the processor 800, to perform data communication with the memory 801.

The processor 800 may be a central processing unit (CPU), a network processor (NP), or a combination of a CPU and an NP. The processor 800 may further include a hardware chip. The hardware chip may be an application-specific integrated circuit (ASIC), a programmable logic device (PLD), or a combination thereof. The PLD may be a complex programmable logic device (CPLD), a field programmable gate array (FPGA), a generic array logic (GAL), or any combination thereof. The memory 801 may include any medium that can store program code, such as a USB flash drive, a removable hard disk, a read-only memory (ROM), a random access memory (RAM), a magnetic disk, or an optical disc.

The processor 800, the memory 801, and the communication interface 802 are connected to each other. Optionally, the processor 800, the memory 801, and the communication interface 802 are connected to each other by using a bus 803. The bus 803 may be a peripheral component interconnect (PCI) bus, an extended industry standard architecture (EISA) bus, or the like. The bus may be classified into an address bus, a data bus, a control bus, or the like. For ease of indication, the bus is indicated by using only one bold line in FIG. 8. However, it does not indicate that there is only one bus or only one type of bus.

For example, the processor 800 is configured to read a program in the memory 801 to:

store, in a data server, subscription data obtained by subscribing to a terminal device; receive a storage address of the subscription data from the data server; store the storage address in a blockchain, where the first network device is in a subscribed network of the terminal device; and send a permission credential to the blockchain, where the permission credential is used to verify permission to obtain the subscription data.

In an embodiment, the processor 800 determines the permission credential in the following manner:

generating a first random number, and generating the permission credential based on the first random number.

In an embodiment, the processor 800 is further configured to:

send the first random number to the terminal device, where the first random number is used to generate a security token, and the security token is used to verify the permission to obtain the subscription data.

In an embodiment, the processor 800 is specifically configured to:

receive a second random number sent by the terminal device, and generate the permission credential based on the first random number and the second random number; or receive a second random number sent by the terminal device, and generate the permission credential based on the first random number, a vehicle identifier of a second network device, and the second random number.

In an embodiment, the processor 800 is further configured to:

determine the vehicle identifier of the second network device according to a roaming agreement between the first network device and the second network device, where the second network device is located in a roaming network of the terminal device.

Figure 9:
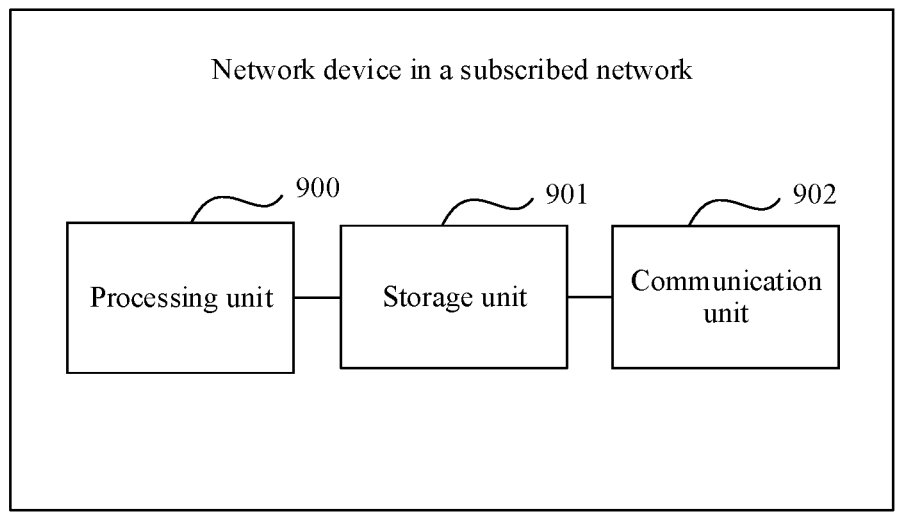
FIG. 9 is a schematic diagram of a network device in a second subscribed network according to this application.

As shown in FIG. 9, this application provides a network device. The network device is located in a subscribed network of a terminal device, and includes: at least one processing unit 900, at least one storage unit 901, and at least one communication unit 902. The communication unit 902 is configured to receive and send data under control of the processing unit 900, the storage unit 901 stores program code, and when the program code is executed by the processing unit 900, the processing unit 900 is configured to:

store, in a data server by using the communication unit, subscription data obtained by subscribing to a terminal device; receive a storage address of the subscription data from the data server; store the storage address in a blockchain, where the first network device is in a subscribed network of the terminal device; and send a permission credential to the blockchain, where the permission credential is used to verify permission to obtain the subscription data.

In an embodiment, the processing unit 900 determines the permission credential in the following manner:

generating a first random number, and generating the permission credential based on the first random number.

In an embodiment, the processing unit 900 is further configured to:

send the first random number to the terminal device, where the first random number is used to generate a security token, and the security token is used to verify the permission to obtain the subscription data.

In an embodiment, the processing unit 900 is specifically configured to:

receive a second random number sent by the terminal device, and generate the permission credential based on the first random number and the second random number; or receive a second random number sent by the terminal device, and generate the permission credential based on the first random number, a vehicle identifier of a second network device, and the second random number.

In an embodiment, the processing unit 900 is further configured to:

determine the vehicle identifier of the second network device according to a roaming agreement between the first network device and the second network device, where the second network device is located in a roaming network of the terminal device.

Figure 10:
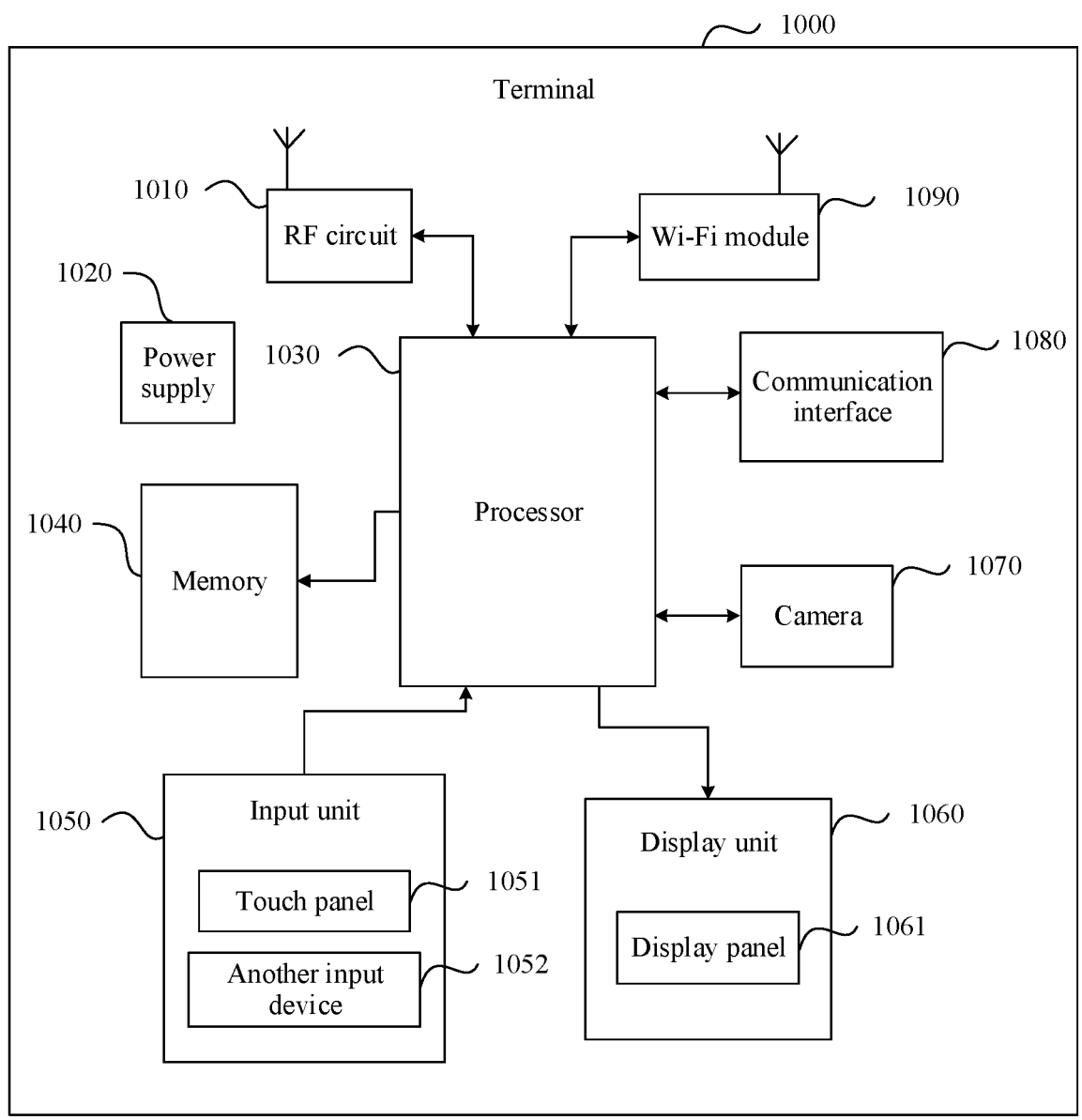
FIG. 10 is a schematic diagram of a terminal device according to this application.

As shown in FIG. 10, an embodiment of this application provides a subscription data management terminal. The terminal 1000 includes components such as a radio frequency (RF) circuit 1010, a power supply 1020, a processor 1030, a memory 1040, an input unit 1050, a display unit 1060, a camera 1070, a communication interface 1080, and a wireless fidelity (Wi-Fi) module 1090. A person skilled in the art may understand that a structure of the terminal shown in FIG. 10 does not constitute a limitation on the terminal. The terminal in embodiments of this application may include more or fewer components than those shown in the figure, or some components may be combined, or different component arrangements may be used.

The following describes each component in the terminal 1000 in detail with reference to FIG. 10.

The RF circuit 1010 may be configured to receive and send data in a communication or call process. Particularly, after receiving downlink data from a base station, the RF circuit 1010 sends the downlink data to the processor 1030 for processing. In addition, the RF circuit 1010 sends to-be-sent uplink data to the base station. Usually, the RF circuit 1010 includes but is not limited to an antenna, at least one amplifier, a transceiver, a coupler, a low noise amplifier (LNA), a duplexer, and the like.

In addition, the RF circuit 1010 may further communicate with a network and another terminal through wireless communication. Any communication standard or protocol may be used for radio communication, including but not limited to global system for mobile communication (GSM), general packet radio service (GPRS), code division multiple access (CDMA), wideband code division multiple access (WCDMA), long term evolution (LTE), an email, a short message service (SMS), and the like.

A Wi-Fi technology is a short-distance wireless transmission technology. The terminal 1000 may be connected to an access point (AP) by using the Wi-Fi module 1090, to access a data network. The Wi-Fi module 1090 may be configured to receive and send data in a communication process.

The terminal 1000 may be physically connected to another terminal by using the communication interface 1080. Optionally, the communication interface 1080 is connected to a communication interface of the another terminal by using a cable, to implement data transmission between the terminal 1000 and the another terminal.

The terminal 1000 can implement a communication service and send information to another contact. Therefore, the terminal 1000 needs to have a data transmission function, that is, the terminal 1000 needs to include a communication module. Although FIG. 10 shows communication modules such as the RF circuit 1010, the Wi-Fi module 1090, and the communication interface 1080, it may be understood that the terminal 1000 includes at least one of the foregoing components or another communication module (for example, a Bluetooth module) configured to implement communication, to transmit data.

For example, when the terminal 1000 is a mobile phone, the terminal 1000 may include the RF circuit 1010, and may further include the Wi-Fi module 1080. When the terminal 1000 is a computer, the terminal 1000 may include the communication interface 1080, and may further include the Wi-Fi module 1090. When the terminal 1000 is a tablet computer, the terminal 1000 may include the Wi-Fi module.

The memory 1040 may be configured to store a software program and a module. The processor 1030 executes various function applications of the terminal 1000 and data processing by running the software program and the module that are stored in the memory 1040. When the processor 1030 executes program code in the memory 1040, some or all processes in FIG. 3 and/or FIG. 4A and FIG. 4B in embodiments of this application may be implemented.

Optionally, the memory 1040 may mainly include a program storage area and a data storage area. The program storage area may store an operating system, various application programs (for example, a communication application), a facial recognition module, and the like. The data storage area may store data (for example, multimedia files such as various pictures and video files, and a facial information template) created based on usage of the terminal, and the like.

In addition, the memory 1040 may include a high-speed random access memory, and may also include a nonvolatile memory, for example, at least one magnetic disk storage device, a flash memory device, or another nonvolatile solid-state storage device.

The input unit 1050 may be configured to receive digital or character information entered by a user, and generate a button signal input related to user setting and function control of the terminal 1000.

Optionally, the input unit 1050 may include a touch panel 1051 and another input terminal 1052.

The touch panel 1051, which is also referred to as a touchscreen, may collect a touch operation of a user on or near the touch panel 1051 (such as an operation of a user on the touch panel 1051 or near the touch panel 1051 by using any suitable object or accessory such as a finger or a stylus), and drive a corresponding connection apparatus based on a preset program. Optionally, the touch panel 1051 may include two parts: a touch detection apparatus and a touch controller. The touch detection apparatus detects a location touched by the user, detects a signal brought by a touch operation, and transmits the signal to the touch controller. The touch controller receives touch information from the touch detection apparatus, converts the touch information into touch point coordinates, and sends the touch point coordinates to the processor 1030, and can receive and execute a command sent by the processor 1030. In addition, the touch panel 1051 may be implemented by using a plurality of types such as a resistive type, a capacitive type, an infrared ray, and a surface acoustic wave type.

Optionally, the another input device 1052 may include but is not limited to one or more of a physical keyboard, a function button (such as a volume control button or a power button), a trackball, a mouse, and a joystick.

The display unit 1060 may be configured to display information entered by the user or information provided for the user, and various menus of the terminal 1000. The display unit 1060 is a display system of the terminal 1000, and is configured to present a screen to implement human-computer interaction.

The display unit 1060 may include a display panel 1061. Optionally, the display panel 1061 may be configured by using a liquid crystal display (LCD), an organic light-emitting diode (OLED), or the like.

Further, the touch panel 1051 may cover the display panel 1061. After detecting a touch operation on or near the touch panel 1051, the touch panel 1051 transmits related information about the touch operation to the processor 1030 to determine a type of the touch event. Subsequently, the processor 1030 provides a corresponding visual output on the display panel 1061 based on the type of the touch event.

In FIG. 10, the touch panel 1051 and the display panel 1061 are used as two independent components to implement input and output functions of the terminal 1000. However, in some embodiments, the touch panel 1051 and the display panel 1061 may be integrated to implement the input and output functions of the terminal 1000.

The processor 1030 is a control center of the terminal 1000, is connected to all components by using various interfaces and lines, and executes various functions of the terminal 1000 and processes data by running or executing the software program and/or the module stored in the memory 1040 and invoking data stored in the memory 1040. Therefore, a plurality of services based on the terminal are implemented.

In embodiments of this application, the processor 1030 is configured to read a program in the memory 1040 to:

receive a first random number sent by a first network device; and generate a security token based on the first random number, and send the security token to a first network element, where the security token is used to verify permission to obtain subscription data, and the first network element is located in a roaming area of a terminal device.

Optionally, the processor 1030 may include one or more processing units. Optionally, the processor 1030 may integrate an application processor and a modem processor. The application processor mainly processes an operating system, a user interface, an application program, and the like. The modem processor mainly processes wireless communication. It may be understood that the modem processor may not be integrated into the processor 1030.

The camera 1070 is configured to implement a photographing function of the terminal 1000, to take a picture or shoot a video. The camera 1070 may further be configured to: implement a scanning function of the terminal 1000, and scan a to-be-scanned object (a two-dimensional code/bar code).

The terminal 1000 further includes the power supply 1020 (such as a battery) configured to supply power to the components. Optionally, the power supply 1020 may be logically connected to the processor 1030 by using a power supply management system, to implement functions such as charging, discharging, and power consumption management by using the power supply management system.

Although not shown, the terminal 1000 may further include at least one sensor, an audio frequency circuit, and the like, and details are not described herein.

The memory 1040 may store program code that is the same as that of the storage unit 1001. When the program code is executed by the processor 1030, the processor 1030 is enabled to implement all functions of the processing unit 900.

In some possible implementations, each aspect of the subscription data management method in embodiments of this application may further be implemented in a form of a program product, and the program product includes program code. When the program code is run on a computer device, the program code is used to enable the computer device to perform steps in the subscription data management method described in this specification based on various example implementations of this application.

The program product may be any combination of one or more readable media. The readable medium may be a readable signal medium or a readable storage medium. For example, the readable storage medium may be, but is not limited to, an electrical, magnetic, optical, electromagnetic, infrared, or semiconductor system, apparatus or device, or any combination thereof. More specific examples (non-exhaustive list) of the readable storage medium include: an electrical connection having one or more conducting wires, a portable disk, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any appropriate combination thereof.

A subscription data management program product based on an implementation of this application may use a portable compact disc read-only memory (CD-ROM) and include program code, and may run on a server device. However, the program product in this application is not limited thereto. In this specification, the readable storage medium may be any tangible medium that includes or stores a program. The program may be used by information transmission, an apparatus, or a device, or used in combination with the program.

The readable signal medium may include a data signal propagated in a baseband or as a part of a carrier, where the data signal carries readable program code. The propagated data signal may be in a plurality of forms, including but not limited to an electromagnetic signal, an optical signal, or any appropriate combination thereof. The readable signal medium may alternatively be any readable medium other than the readable storage medium. The readable medium may send, propagate, or transmit a program used by or in combination with a periodic network action system, apparatus, or device.

The program code included in the readable medium may be transmitted by using any appropriate medium, including but not limited to a wireless medium, a wired medium, an optical cable, an RF medium, or any appropriate combination thereof.

The program code used to execute the operations of this application may be written in any combination of one or more program design languages. The program design languages include object-oriented program design languages such as Java and C++, and further include a conventional procedural program design language such as a "C" language or a similar program design language. The program code may be completely executed on a computing device of a user, partially executed on user equipment, executed as an independent software package, partially executed on a computing device of a user and partially executed on a remote computing device, or completely executed on a remote computing device or a server. When the program code is executed on the remote computing device, the remote computing device may be connected to the computing device of the user by using any type of network, including a local area network (LAN) or a wide area network (WAN), or may be connected to an external computing device.

An embodiment of this application further provides a computing device-readable storage medium for a subscription data management method performed by a network device, so that content is not lost after a power failure. The storage medium stores a software program including program code. When the program code is run on a computing device, and the software program is read and executed by one or more processors, any subscription data management solutions in embodiments of this application can be implemented.

An embodiment of this application further provides a computing device-readable storage medium for a subscription data management method performed by a terminal device, so that content is not lost after a power failure. The storage medium stores a software program including program code. When the program code is run on a computing device, and the software program is read and executed by one or more processors, any subscription data management solutions in embodiments of this application can be implemented.

The foregoing describes this application with reference to the block diagrams and/or flowcharts of the method, the apparatus (system), and/or the computer program product in the embodiments of this application. It should be understood that a block of the block diagrams and/or flowcharts and a combination of blocks in the block diagrams and/or flowcharts, can be implemented by using computer program instructions. These computer program instructions may be provided to a processor of a general-purpose computer, a processor of a special-purpose computer, and/or another programmable data processing apparatus to produce a machine, so that the instructions executed by the processor of the computer and/or the another programmable data processing apparatus create a method for implementing a specified function/action in a block in the block diagrams and/or flowcharts.

Correspondingly, this application may further be implemented by using hardware and/or software (including firmware, resident software, microcode, and the like). Still further, this application may be in a form of a computer program product on a computer-usable or computer-readable storage medium. The computer program product has computer-usable or computer-readable program code implemented in the medium, so that the computer-usable or computer-readable is used by an instruction execution system or used in combination with an instruction execution system. In the context of this application, the computer-usable or computer-readable medium may be any medium, and may include, store, communicate, transmit, or transfer a program, for use by an instruction execution system, apparatus, or device or used in combination with an instruction execution system, apparatus, or device.

Although this application is described with reference to specific features and embodiments thereof, it is clear that various modifications and combinations may be made to this application without departing from the spirit and scope of this application. Correspondingly, the specification and accompanying drawings are merely examples for description of this application defined by the claims, and are intended to cover any of or all modifications, variations, combinations or equivalents within the scope of this application. It is clear that a person skilled in the art can make various modifications and variations to this application without departing from the scope of this application. This application is intended to cover these modifications and variations of this application provided that they fall within the scope of the claims of this application and their equivalent technologies.

What is claimed is:

1. A subscription data management method, comprising:
generating, by a first network element, a permission credential based on a first random number generated by the first network element and a second random number received from a terminal device;
providing, by the first network element, a permission contract to a blockchain, the permission contract including the permission credential;
receiving, by the first network element, a request message from a second network element, wherein the second network element is located in a roaming area of the terminal device, and the request message is used to request subscription data of the terminal device;
obtaining, by the first network element, a security token of the terminal device, wherein the security token is based on the first random number and is used to verify whether the second network element has permission to obtain the subscription data;
providing, by the first network element, the security token for the blockchain, and querying the blockchain about the subscription data, wherein the querying includes invoking the permission contract in the blockchain to query the subscription data;
in response to a verification of the security token, obtaining, by the first network element, address information of the subscription data from the blockchain; and
sending, by the first network element, the address information of the subscription data to the second network element.

2. The method according to claim 1, wherein the obtaining, by the first network element, a security token of the terminal device comprises:
obtaining, by the first network element, the security token locally; or
receiving, by the first network element, the security token sent by the second network element.

3. The method according to claim 1, wherein the querying, by the first network element, the blockchain about the subscription data comprises:

providing, by the first network element, an identifier of the terminal device for the blockchain, wherein the identifier of the terminal device is used to determine the subscription data corresponding to the terminal device.

4. The method according to claim 1, wherein after the obtaining, by the first network element, address information of the subscription data from the blockchain, the method further comprises:
  decrypting, by the first network element, the address information of the subscription data, to obtain a storage address of the subscription data in a database.

5. The method according to claim 1, wherein the first network element is a blockchain handling function (BCHF) in a roaming network or a BCHF in the blockchain.

6. The method according to claim 1, wherein the second network element is an access and mobility management function (AMF) or a session management function (SMF) in the roaming network.

7. A subscription data management method, comprising:
  storing, by a first network device, subscription data subscribed by the first network device to a terminal device into a data server;
  receiving, by the first network device, a storage address of the subscription data from the data server;
  storing, by the first network device, the storage address in a blockchain, wherein the first network device is located in a subscribed network of the terminal device;
  generating, by the first network device, a first random number;
  receiving, by the first network device, a second random number sent by the terminal device;
  generating, by the first network device, a permission credential based on the first random number and the second random number; and
  sending, by the first network device, the permission credential to the blockchain, wherein the permission credential is used to verify permission to obtain the subscription data.

8. The method according to claim 7, wherein after the generating, by the first network device, a first random number, the method further comprises:
  sending, by the first network device, the first random number to the terminal device, wherein the first random number is used to generate a security token, and the security token is used to verify the permission to obtain the subscription data.

9. The method according to claim 7, wherein
  the generating the permission credential based on the first random number and the second random number;
  includes generating the permission credential based on the first random number, a vehicle identifier of a second network device, and the second random number.

10. The method according to claim 9, wherein the first network device
  determines the vehicle identifier of the second network device according to a roaming agreement between the first network device and the second network device, wherein the second network device is located in a roaming network of the terminal device.

11. A subscription data management apparatus, comprising a processor and a transceiver, wherein
  the transceiver is configured to receive a second random number from a terminal device,
  the processor is configured to:
  generate a first random number;
  generate a permission credential based on a first random and the second random number; and
  provide a permission contract to a blockchain, the permission contract including the permission credential;
  the transceiver is further configured to receive a request message from a second network element, wherein the second network element is located in a roaming area of the terminal device, and the request message is used to request subscription data of the terminal device;
  the processor is further configured to:
  obtain a security token of the terminal device, wherein the security token is based on the first random number and is used to verify whether the second network element has permission to obtain the subscription data;
  provide the security token for the a blockchain, and query the blockchain about the subscription data, by invoking the permission contract in the blockchain to query the subscription data; and
  in response to a verification of the security token, obtain address information of the subscription data from the blockchain; and
  the transceiver is further configured to send the address information of the subscription data to the second network element.

12. The subscription data management apparatus according to claim 11, wherein the processor is configured to:
  obtain the security token locally; or
  receive, using the transceiver, the security token sent by the second network element.

13. The subscription data management apparatus according to claim 11, wherein the processor is configured to:
  provide an identifier of the terminal device for the blockchain, wherein the identifier of the terminal device is used to determine the subscription data corresponding to the terminal device.

14. The subscription data management apparatus according to claim 11, wherein the processor is further configured to:
  decrypt the address information of the subscription data, to obtain a storage address of the subscription data in a database.

15. The subscription data management apparatus according to claim 11, wherein a first network element is a blockchain handling function (BCHF) in a roaming network or a BCHF in the blockchain.

16. The subscription data management apparatus according to claim 11, wherein the second network element is an access and mobility management function (AMF) or a session management function (SMF) in the roaming network.

* * * * *